United States Patent
Dulac et al.

(10) Patent No.: US 10,795,053 B2
(45) Date of Patent: Oct. 6, 2020

(54) SYSTEMS AND METHODS OF MULTI-SCALE MESHING FOR GEOLOGIC TIME MODELING

(71) Applicant: PARADIGM SCIENCES LTD., Grand Cayman (KY)

(72) Inventors: Jean-Claude Dulac, Sugarland, TX (US); Wan-Chiu Li, Nancy (FR)

(73) Assignee: EMERSON PARADIGM HOLDING LLC, Houston, TX (US)

( * ) Notice: Subject to any disclaimer, the term of this patent is extended or adjusted under 35 U.S.C. 154(b) by 873 days.

(21) Appl. No.: 14/526,844

(22) Filed: Oct. 29, 2014

(65) Prior Publication Data
US 2015/0120262 A1 Apr. 30, 2015

Related U.S. Application Data

(60) Provisional application No. 61/896,760, filed on Oct. 29, 2013.

(51) Int. Cl.
*G01V 99/00* (2009.01)
*G01V 1/32* (2006.01)

(52) U.S. Cl.
CPC ............ *G01V 99/005* (2013.01); *G01V 1/325* (2013.01)

(58) Field of Classification Search
None
See application file for complete search history.

(56) References Cited

U.S. PATENT DOCUMENTS 4,821,164 A  4/1989  Swanson
4,964,099 A  10/1990  Carron
(Continued)

FOREIGN PATENT DOCUMENTS

AU  2002329615  7/2002
CA  2455810  7/2005
(Continued)

OTHER PUBLICATIONS

Caumon, et al., "Three-Dimensional Implicit Stratigraphic Model Building From Remote Sensing Data on Tetrahedral Meshes: Theory and Application to a Regional Model of La Popa Bsin, NE Mexico", IEEE Transactions on Geoscience and Remote Sensing, vol. 51, No. 3, Mar. 2013, pp. 1613-1621.*

(Continued)

*Primary Examiner* — Doon Y Chow
*Assistant Examiner* — Phuong N Hoang
(74) *Attorney, Agent, or Firm* — Pearl Cohen Zedek Latzer Baratz LLP

(57) ABSTRACT

A system and method for modeling a geological structure may include, in an initial model, computing a first function for a geological structure including a first set of iso-surfaces. A processor may detect if the first set of iso-surfaces intersect a set of geological markers within a threshold proximity. If not, the initial model may be corrected using an induced mesh having an increased cell resolution compare to the initial model for computing a second function for the geological structure including a second set of iso-surfaces that intersect the geological markers within the threshold proximity. A processor may insert the second set of iso-surfaces into a second model to locally increase its resolution relative to the initial model by dividing cells in the second model along the second set of iso-surfaces. For each new geological structure, the above steps may be repeated using the second model as the initial model.

23 Claims, 11 Drawing Sheets

(56) References Cited

U.S. PATENT DOCUMENTS

| | | |
|---|---|---|
| 4,991,095 A | 2/1991 | Swanson |
| 5,465,323 A | 11/1995 | Mallet |
| 5,475,589 A | 12/1995 | Armitage |
| 5,586,082 A | 12/1996 | Anderson et al. |
| 5,594,807 A | 1/1997 | Liu |
| 5,671,136 A | 9/1997 | Willhoit |
| 5,844,799 A | 12/1998 | Joseph et al. |
| 5,995,907 A | 11/1999 | Van Bemmel et al. |
| 6,018,498 A | 1/2000 | Neff et al. |
| 6,106,561 A | 8/2000 | Farmer |
| 6,138,076 A | 10/2000 | Graf et al. |
| 6,151,555 A | 11/2000 | Van Bemmel et al. |
| 6,246,963 B1 | 6/2001 | Cross et al. |
| 6,278,949 B1 | 8/2001 | Alam |
| 6,353,577 B1 | 3/2002 | Orban et al. |
| 6,597,995 B1 | 7/2003 | Cornu et al. |
| 6,725,174 B2 | 4/2004 | Bouts et al. |
| 6,771,800 B2 | 8/2004 | Keskes et al. |
| 6,778,909 B1 | 8/2004 | Popovici et al. |
| 6,791,900 B2 | 9/2004 | Gillard et al. |
| 6,820,043 B2 | 11/2004 | Mallet et al. |
| 6,847,737 B1 | 1/2005 | Kouri et al. |
| 6,850,845 B2 | 2/2005 | Stark |
| 6,889,142 B2 | 5/2005 | Schonewille |
| 6,904,169 B2 | 6/2005 | Kalevo et al. |
| 7,024,021 B2 | 4/2006 | Dunn et al. |
| 7,089,166 B2 | 8/2006 | Malthe-Sorenssen et al. |
| 7,126,340 B1 | 10/2006 | Ameen et al. |
| 7,187,794 B2 | 3/2007 | Liang et al. |
| 7,227,983 B1 | 6/2007 | Christian et al. |
| 7,248,539 B2 | 7/2007 | Borgos et al. |
| 7,280,918 B2 | 10/2007 | Williams |
| 7,412,363 B2 | 8/2008 | Callegari |
| 7,418,149 B2 | 8/2008 | Dinh et al. |
| 7,446,765 B2 | 11/2008 | Dugge |
| 7,480,205 B2 | 1/2009 | Wei et al. |
| 7,523,024 B2 | 4/2009 | Endres et al. |
| 7,561,992 B2 | 7/2009 | Leflon et al. |
| 7,660,481 B2 | 2/2010 | Schaap et al. |
| 7,711,532 B2 | 5/2010 | Dulac et al. |
| 7,742,875 B2 | 6/2010 | Li et al. |
| 7,744,534 B2 | 6/2010 | Chalana et al. |
| 7,844,402 B2 | 11/2010 | Klein et al. |
| 7,869,954 B2 | 1/2011 | Lennert et al. |
| 7,970,593 B2 | 6/2011 | Roggero et al. |
| 8,010,294 B2 | 8/2011 | Dorn et al. |
| 8,065,088 B2 | 11/2011 | Dorn et al. |
| 8,117,019 B2 | 2/2012 | Sun et al. |
| 8,150,663 B2 | 4/2012 | Mallet |
| 8,219,370 B1 | 7/2012 | DiVerdi et al. |
| 8,274,859 B2 | 9/2012 | Maucec et al. |
| 8,600,708 B1 | 12/2013 | Mallet et al. |
| 8,635,052 B1 | 1/2014 | Mallet et al. |
| 8,711,140 B1 | 4/2014 | Mallet |
| 8,743,115 B1 | 6/2014 | Mallet et al. |
| 8,803,878 B2 * | 8/2014 | Andersen ............... G01V 99/00 345/424 |
| 2001/0036294 A1 | 11/2001 | Keskes et al. |
| 2002/0032550 A1 | 3/2002 | Ward et al. |
| 2003/0018436 A1 | 1/2003 | Stark |
| 2003/0023383 A1 | 1/2003 | Stark et al. |
| 2003/0216897 A1 | 11/2003 | Endres et al. |
| 2004/0122640 A1 | 6/2004 | Dusterhoft |
| 2004/0260476 A1 | 12/2004 | Borgos et al. |
| 2004/0267454 A1 | 12/2004 | Granjeon |
| 2005/0114831 A1 | 5/2005 | Callegari et al. |
| 2005/0216197 A1 | 9/2005 | Zamora et al. |
| 2006/0004522 A1 | 1/2006 | Cacas |
| 2006/0025976 A1 | 2/2006 | Kennon et al. |
| 2006/0122780 A1 | 6/2006 | Cohen et al. |
| 2006/0133206 A1 | 6/2006 | Barnes |
| 2006/0253759 A1 | 11/2006 | Wei |
| 2007/0239414 A1 | 10/2007 | Song et al. |
| 2008/0021684 A1 | 1/2008 | Dulac et al. |
| 2008/0232694 A1 | 9/2008 | Sulatycke |
| 2008/0243452 A1 | 10/2008 | Bowers et al. |
| 2008/0273421 A1 | 11/2008 | Koren et al. |
| 2009/0070079 A1 | 3/2009 | Harada |
| 2009/0122060 A1 | 5/2009 | Porat et al. |
| 2009/0157322 A1 | 6/2009 | Levin |
| 2009/0204377 A1 | 8/2009 | Wagoner et al. |
| 2009/0231955 A1 | 9/2009 | Barnes |
| 2010/0156920 A1 | 6/2010 | Shin et al. |
| 2010/0186950 A1 * | 7/2010 | Neelamani ............... G01V 1/30 166/250.01 |
| 2010/0245347 A1 | 9/2010 | Dorn et al. |
| 2011/0015910 A1 | 1/2011 | Ran et al. |
| 2011/0054857 A1 | 3/2011 | Moguchaya |
| 2011/0115787 A1 | 5/2011 | Kadlec |
| 2011/0313745 A1 | 12/2011 | Mezghani et al. |
| 2012/0037379 A1 | 2/2012 | Hilliard et al. |
| 2012/0072116 A1 | 3/2012 | Dorn et al. |
| 2013/0204598 A1 | 8/2013 | Mallet |
| 2013/0231903 A1 | 9/2013 | Li et al. |
| 2013/0246031 A1 | 9/2013 | Wu et al. |
| 2013/0262052 A1 | 10/2013 | Mallet et al. |
| 2014/0136171 A1 * | 5/2014 | Sword, Jr. ............... G01V 11/00 703/10 |
| 2014/0278106 A1 | 9/2014 | Mallet |
| 2015/0009215 A1 * | 1/2015 | Vallikkat Thachaparambil .......... G06T 19/20 345/420 |
| 2016/0124113 A1 * | 5/2016 | Bi ........................... G06T 17/05 703/1 |
| 2016/0124117 A1 * | 5/2016 | Huang ..................... G06T 17/05 703/2 |

FOREIGN PATENT DOCUMENTS

| | | |
|---|---|---|
| FR | 2987903 | 9/2013 |
| GB | 2444506 A | 6/2008 |
| GB | 2444167 B | 3/2011 |
| RU | 2145100 | 1/2000 |
| WO | WO 99/41676 | 8/1999 |
| WO | WO 03/009003 A1 | 1/2003 |
| WO | WO 03/050766 | 6/2003 |
| WO | WO 2006/007466 A2 | 1/2006 |
| WO | WO 08/005690 | 1/2008 |
| WO | WO 2011/077227 | 6/2011 |
| WO | WO 2013/028237 | 2/2013 |

OTHER PUBLICATIONS

U.S. Appl. No. 14/059,099, filed Oct. 21, 2013, Mallet et al.
U.S. Appl. No. 14/065,713, filed Oct. 29, 2013, Mallet et al.
U.S. Appl. No. 14/189,505, filed Feb. 25, 2014, Mallet.
U.S. Appl. No. 14/485,018, filed Sep. 12, 2014, Hugot et al.
U.S. Appl. No. 13/862,680, filed Apr. 15, 2013, Tertois, et al.
U.S. Appl. No. 14/260,760, filed Apr. 24, 2014, Mallet, et al.
Bakker, "Image Structure Analysis for Seismic Interpretation," doctoral thesis, publicly defended on Jun. 4, 2002.
Carr et al., "Reconstruction and Representation of 3D Objects with Radial Basis Functions," ACM SIGGRAPH 2001, ACM Press New York, Computer Graphics Proceedings, pp. 67-76, 2001 (ISBN 1-58113-374-X).
Chiles et al., "Modelling the Geometry of Geological Units and its Uncertainty in 3D From Structural Data: The Potential-Field Method," Orebody Modelling and Strategic Mine Planning, pp. 313-320, Nov. 22-24, 2004.
Cignoni et al., "Multiresolution Representation and Visualization of Volume Data," IEEE Transactions on Visualizations and Computer Graphics; 3(4), Oct.-Dec. 1997; pp. 352-369.
Claerbout, "Fundamentals of Geophysical Data Processing with Applications to Petroleum Prospecting," Blackwell Scientific Publications, 1985.
Clawson et al., "The Value of 3D Seismic Attributes for Illuminating Deep Water Deposits by Seismic Forward Modeling of the Brushy Canyon Formation," 2003 SEG Annual Meeting, Oct. 26-31, 2003, Dallas, Texas (only Abstract submitted).

(56) References Cited

OTHER PUBLICATIONS

Courrioux et al., "3D Volumetric modelling of Cadomian Terranes (Northern Brittany, France): an automatic method using Voronoi diagrams," Tectonophysics 331(1-2), Feb. 2001, pp. 181-196.
Cremeens et al., "On Chronostratigraphy, Pedostratigraphy, and Archaeological Context," Soil Science Society of America, 1995.
Cuisenaire, "Distance Transformations: Fas Algorthms and Applications to Medical Image Processing," Laboratoire de Telecommunications et Teledetection; Oct. 1999.
Davies, "Conditioning Poorly Sampled Gathers for Pre and Post Stack Analysis," Journal of Conference Abstracts, 2002, vol. 7, No. 2, pp. 142-143.
De Groot et al., "How to create and use 3D Wheeler transformed seismic volumes," SEG/New Orleans 2006 Annual Meeting, pp. 1038-1042.
Dorn, "Chapter 13, Interpreting 3-D Seismic Data," The Leading Edge, Sep. 1998, p. 1261-1272.
Dulac, "Advances in chrono-stratigraphic interpretation modeling," First Break, vol. 27, Oct. 2009.
Durand-Riard et al., "Balanced restoration of geological volumes with relaxed meshing constraints," Computers and Geosciences, vol. 36, No. 4, pp. 441-452, Nov. 17, 2010.
EAGE Daily News, "Paradigm is Redefining Interpretation," 2011 EAGE Conference & Exhibition, May 2011.
Egan et al., "Three-Dimensional Modelling and Visualisation in Structural Geology: New Techniques for the Restoration and Balancing of Volumes," Proceedings of GIG Conference on Geological Visualisation—the Intelligent Picture?, British Geological Survey, Oct. 1996.
Escalona et al., Sequence-stratigraphic analysis of Eocene clastic foreland basin deposits in central Lake Maracaibo using high-resolution well correlation and 3-D seismic data, AAPG Bulletin, vol. 90, No. 4, pp. 581-623 (Apr. 2006) (only abstract submitted).
Frank et al., "3D-reconstruction of Complex Geological Interfaces from Irregularly Distributed and Noisy Point Data," Computers & Geosciences 33 (2007) 932-943.
Frank, "Advanced Visualization and Modeling of Tetrahedral Meshes," Doctorat de l'Institut National Poly technique de Lorraine; pp. 1-140; 2006.
"Geomodeling Releases VisualVoxAT™ 6.2 Software—Introducing the Geobody Paintbrush," New Release, Sep. 24, 2007, printed from http://www.geomodeling.com/news_22.htm; on Oct. 5, 2009.
Gibbons, "Seismic Applications Overview," Society of Petroleum Engineers, Aug. 2003, 9 pages.
GoCAD Suite 2.5 2007 User Guide: Parts 1-12, published Sep. 15, 2007.
Harris et al., "Fault Seal Risk Volumes—A New Tool for the Assessment of Reservoir Compartmentalisation" 71st EAGE Conference & Exhibition—Amsterdam, The Netherlands, Jun. 8-11, 2009.
Jayr et al., "The Need for a Correct Geological Modelling Support: the Advent of the UVT-Transform," First Break, vol. 26, Oct. 2008, pp. 73-79.
Jentzsch et al., "Kinematic subsidence modelling of the Lower Rhine Basin," Netherlands Journal of Geosciences, vol. 81, No. 2, pp. 231-239 (2002).
Jones, "Data structures for three-dimensional spatial information systems in geology," Int. J. Geographical Information Systems, 3(1), 1989, pp. 15-30.
Labrunye et al., "New 3D flattened space for seismic interpretation," SEG Houston 2009 International Exposition and Annual Meeting, pp. 1132-1136.
Ledez, "Modelisation D'Objets Naturals par Formulation Implicite," Ecole Nationale Superieure de Geologie; Oct. 28, 2003; pp. 1-158, see English Abstract.
Lee et al., "Pitfalls in Seismic Data Flattening," The Leading Edge, Feb. 2001, pp. 161-164.
Lepage, "Generation de Maillages Tridimensionnels Pour la Simulation des Phenomenes Physiques en Geosciences," Ecole National Superieure de Geologie; Oct. 28, 2003; pp. 1-224, see English Abstract.
Lessenger et al., "An Inverse Stratigraphic Simulation Model: Is stratigraphic Inversion Possible?" Energy Exploration & Exploitation, vol. 14, No. 6, pp. 627-637 (1996) (only Abstract submitted).
Ligtenberg et al., "Sequence Stratigraphic Interpretation in the Wheeler Transformed (Flattened) Seismic Domain," EAGE 68th Conference & Exhibition—Vienna, Austria, Jun. 12-15, 2006.
Liwanag, "Reservoir Characterisation, Introducing geological processes in reservoir models," GEO ExPro Oct. 2005, pp. 28-32.
Lixin, "Topological relations embodied in a generalized tri-prism (GTP) model for a 3D geoscience modeling system," Computers & Geosciences 30(4), May 2004, pp. 405-418.
Lomask et al., "Flattening Without Picking," Geophysics, vol. 71, No. 4, pp. P13-P20, Jul.-Aug. 2006.
Lomask et al., "Flattening Without Picking," Stanford Exploration Project, Report 112, Nov. 11, 2002, pp. 141-150.
Lomask et al., "Update on Flattening Without Picking," Stanford Exploration Project, Report 120, May 3, 2005, pp. 137-159.
Lomask, "Flattening 3-D Seismic Cubes Without Picking," Jan. 8, 2004.
Mallet, "Discrete Smooth Interpolation in Geometric Modelling," Journal of Computer Aided Design, 24(4), 1992, pp. 178-191.
Mallet, "Numerical Earth Models," 2008 EAGE Publications, ISBN 978-90-73781-63-4, p. 147-157.
Mallet, "Space-time Mathematical Framework for Sedimentary Geology," Journal of Mathematical Geology, vol. 36, No. 1, Jan. 2004, pp. 1-32.
Mallet, Geomodeling (Book chapter); Chapter 6; Oxford University Press; cover and preface pages and pp. 244-315, 2002.
Mallet, *Geomodeling*, Oxford University Press, Sep. 22, 2004 (ISBN 0-19-514460.0).
Mitchum et al., "Seismic Stratigraphy and Global Changes of Sea Level, Part 6: Stratigraphic Interpretation of Seismic Reflection Patterns in Depositional Sequences," received Jan. 6, 1977, accepted Jun. 13, 1977, pp. 117-133.
Monsen et al., "Geological process controlled interpretation based on 3D Wheeler diagram generation," SEG/San Antonio 2007 Annual Meeting, pp. 885-889.
Moretti et al., "KINE3D: a New 3D Restoration Method Based on a Mixed Approach Linking Geometry and Geomechanics," Oil & Gas Science and Techonology, Rev. IFP, vol. 61 (2006), No. 2, pp. 277-289.
Moyen et al., "3D-Parameterization of the 3D Geological Space—The Geochron Model," 9th European Conference on the Mathematics of Oil Recovery, Geological Modelling I, Aug. 30, 2004.
Moyen, "Paramétrisation 3D de L'espace en Géologie Sédimentaire: Le Modèle Geochron Thèse," Doctorat de l'Institut National Polytechnique de Lorraine, Jun. 9, 2005 (original text in French and English translation).
Müller et al. "3D Restoration and mechanical properties," from structure.harvard.edu/projects/restoration, Harvard University Structural Geology and Earth Resources Group, 2005, accessed on Aug. 21, 2012.
O'Malley et al., "Towards Robust Structure-Based Enhancement and Horizon Picking in 3-D Seismic Data," Proceedings of the 2004 IEEE Computer Society Conference on Computer Vision and Pattern Recognition (CVPR '04), 2004, vol. 2, pp. 482-489.
OpendTect Workflows Documentation version 4.2, dGB Beheer B.V., dGB Earth Sciences, Copyright © 2002-2010.
Oyedele, "3-D High Resolution Seismic Imaging of Middle-Late Quaternary Depositional Systems, Southeast Green Canyon, Sigsbee Escarpment, Gulf of Mexico," Thesis presented to the Faculty of the Dept. of Geosciences at the University of Houston, Aug. 2005.
Rouby et al., "3-D Restoration of Complexly Folded and Faulted Surfaces Using Multiple Unfolding Mechanisms," AAPG Bulletin, vol. 84, No. 6, pp. 805-829 (Jun. 2000).
Rumpf et al., "A Continuous Skeletonization Method Based on Level Sets," Joint EUROPGRAPHICS—IEEE Symposium on Visualization, pp. 151-157 (2002).

(56) References Cited

OTHER PUBLICATIONS

Saito, "New Algorithms for Euclidean Distance Transformation of an n-Dimensional Digitized Picture with Applications," Pattern Recognition, 27(11) 1994; pp. 1551-1565.
Samson et al., "Quantifying the Impact of Structural Uncertainties on Gross-Rock Volume Estimates", SPE 1996, pp. 381-392.
Smith et al., "SUSAN—A New Approach to Low Level Image Processing," International Journal of Computer Vision, 1997, vol. 23, Iss. 1, pp. 45-78.
Souche, "Integration of fault models into unstructured grids and geo-chronological space," 24th GOCAD Meeting, Jun. 2004.
Stark, "Generation of a 3D seismic Wheeler Diagram' from a high resolution Age Volume," pp. 782-786, submitted to the 75th Annual SEG Convention, Nov. 6-11, 2005, Houston, TX.
Stark, "Relative Geologic Time (Age) Volumes—Relating Every Seismic Sample to a Geologically Reasonable Horizon," The Leading Edge, Sep. 2004, pp. 928-932.
Terraspark Geosciences, "Geoscience Interpretation Visualization Consortium (GIVC)," http://terraspark.com/GIVC.consort, accessed on May 11, 2006.
Tertois et al., "Editing faults within tetrahedral volume models in real time," in Jolley, S.J., Barr, D., Walsh, J.J. et al. (Eds), Structurally Complex Reservoirs, London, UK: Geological Society of London, Special Publications 2007; v. 292; p. 89-101 (doi: 10.1144/SP292.5).
Tertois et al., Real-time Tetrahedral Volume Editing Accounting for Discontinuities; Ninth International Conference on Computer Aided Design and Computer Graphics (CAD/CG 2005) 2005 IEEE; pp. 1-6).
Tertois, "Création et édition de modèles géologiques par Champs de potential: Application au modele GeoChron—Thèse," Institute National Polytechnique de Lorraine, Jun. 21, 2007.
Tertois, Preserving Geological Information During Real-Time Editing of Faults in Tetrahedral Models; Int. Assoc. for Mathematic Geology Xith International Congress Universite de Liege—Belgium; 2006; S14-24; pp. 1-4.
Thomsen et al., "Towards a balanced 3D Kinematic Model of a Faulted Domain—the Bergheim Open Pit Mine, Lower Rhine Basin," Netherlands Journal of Geoscience, vol. 81, No. 2, pp. 241-250 (2002).
Thore et al., Integration of Structural Uncertainties into Reservoir grids construction—70th EAGE Conference & Exhibition—Rome, Italy, Jun. 9-12, 2008.
Wen et al., "Use of Border Regions for Improved Permeability Upscaling," Mathematical Geology, 35(5), Jul. 2003; pp. 521-547.
Zeng et al., High-frequency Sequence Stratigraphy from Seismic Sedimentology: Applied to Miocene, Vermilion Block 50, Tiget Shoal Area Offshoure Louisiana, AAPG Bulletin, Feb. 2004, vol. 88, No. 2, pp. 153-174 (only Abstract submitted).
Zeng et al., "Seismic Frequency Control on Carbonate Seismic Stratigraphy: A Case Study of the Kingdom Abo Sequence, West Texas," AAPG Bulletin, vol. 87, Issue No. 2, pp. 273-293 (2003) (only Abstract submitted).
Zeng et al., "Stratal Slicing of Miocene-Pliocene Sediments in Vermilion Block 50-Tiger Shoal Area, Offshore Louisiana," The Leading Edge, Offshore Technology Special Section, vol. 20, No. 4, Apr. 2001, pp. 408-418.
Zeng et al., "Stratal Slicing, Part I: Realistic 3-D Seismic Model," Geophysics, Seg, vol. 63, No. 2, Mar. 1998-Apr. 1998, pp. 502-513.
Zeng et al., "Stratal Slicing, Part II: Read 3-D Seismic Data," Geophysics, vol. 63, No. 2 (Mar-Apr. 1998); pp. 514-522.
Zeng et al., "Three-D Seismic Facies Imaging by Stratal Slicing of Miocene-Pliocene Sediments in Vermilion Block 50-Tiger Shoal Area, Offshore Louisiana," Secondary Gas Recovery, AAPG 2000.
Zeng, "From Seismic Stratigraphy to Seismic Sedimentology: A Sensible Transition," GCAGS Transactions, vol. 51, pp. 413-420 (2001) (only Abstract submitted).
Zeng, "Stratal Slicing: Benefits and Challenges," The Leading Edge 29, 1040 (Sep. 2010).
Zeng et al., "Stratal Slicing and Seismic Facies Imaging," Bureau of Economic Geology, The University of Texas at Austin, 1998. (only Abstract submitted).
Office Action issued for U.S. Appl. No. 11/628,559, dated Jun. 24, 2009.
Notice of Allowance issued for U.S. Appl. No. 11/628,559, dated Dec. 24, 2009.
Notice of Allowance issued for U.S. Appl. No. 12/791,352 dated Dec. 6, 2013.
Office Action issued for U.S. Appl. No. 12/791,370, dated Nov. 26, 2012.
Notice of Allowance issued for U.S. Appl. No. 12/791,370, dated Jul. 22, 2013.
Office Action issued for U.S. Appl. No. 12/791,483, dated Aug. 17, 2012.
Office Action issued for U.S. Appl. No. 12/909,981 dated Aug. 19, 2013.
Notice of Allowance issued for U.S. Appl. No. 12/909,981 dated Jan. 27, 2014.
Office Action issued for U.S. Appl. No. 14/059,099, dated Jun. 16, 2014.
Notice of Allowance issued for U.S. Appl. No. 14/059,099, dated Oct. 21, 2014.
Office Action issued for U.S. Appl. No. 14/065,713, dated Jun. 19, 2014.
Notice of Allowance issued for U.S. Appl. No. 14/065,713, dated Oct. 20, 2014.
Office Action issued for U.S. Appl. No. 14/189,505, dated Dec. 4, 2014.
Office Action issued for U.S. Appl. No. 14/260,760, dated Jul. 9, 2014.
Final Office Action issued for U.S. Appl. No. 14/260,760, dated Nov. 14, 2014.
Final Office Action issued for U.S. Appl. No. 14/260,760, dated Nov. 25, 2014.
Office Action issued for U.S. Appl. No. 14/211,744, dated Jun. 3, 2014.
International Search Report issued for PCT International Application No. PCT/IB2004/002030, dated Jan. 25, 2005.
Caumon et al. "Building and Editing a Sealed Geological Model," Mathematical Geology, vol. 36, No. 4, May 2004; pp. 405-424.
Caumon et al., "Elements for Stochastic Structural Perturbation of Stratigraphic Models," Proc. Petroleum Geostatistics, Sep. 10-14, 2007.
Paradigm™ SKUA™ 2009 User Guide: Part V Seismic Interpretation Modeling, Feb. 3, 2009.
Trudgill et al., "Integrating 3D Seismic Data with Structural Restorations to Elucidate the Evolution of a Stepped Counter-Regional Salt System, Eastern Louisiana Shelf, Northern Gulf of Mexico," pp. 165-176. (2004).
Wood et al., "Applying Sequence Stratigraphy and Seismic Stratal Slice Technology in the Gulf of Mexico," GASTIPS, Lang et al. (Eds.), Winter 2003, vol. 9, No. 1, pp. 10-21.
Zeng et al., "Interpretive Advantages of 90 Degree-Phase Wavelets: Part 2—Seismic Applications," Geophysics, SEG, vol. 70, No. 3, May 2005-Jun. 2005. pp. C-17-C-24.

* cited by examiner

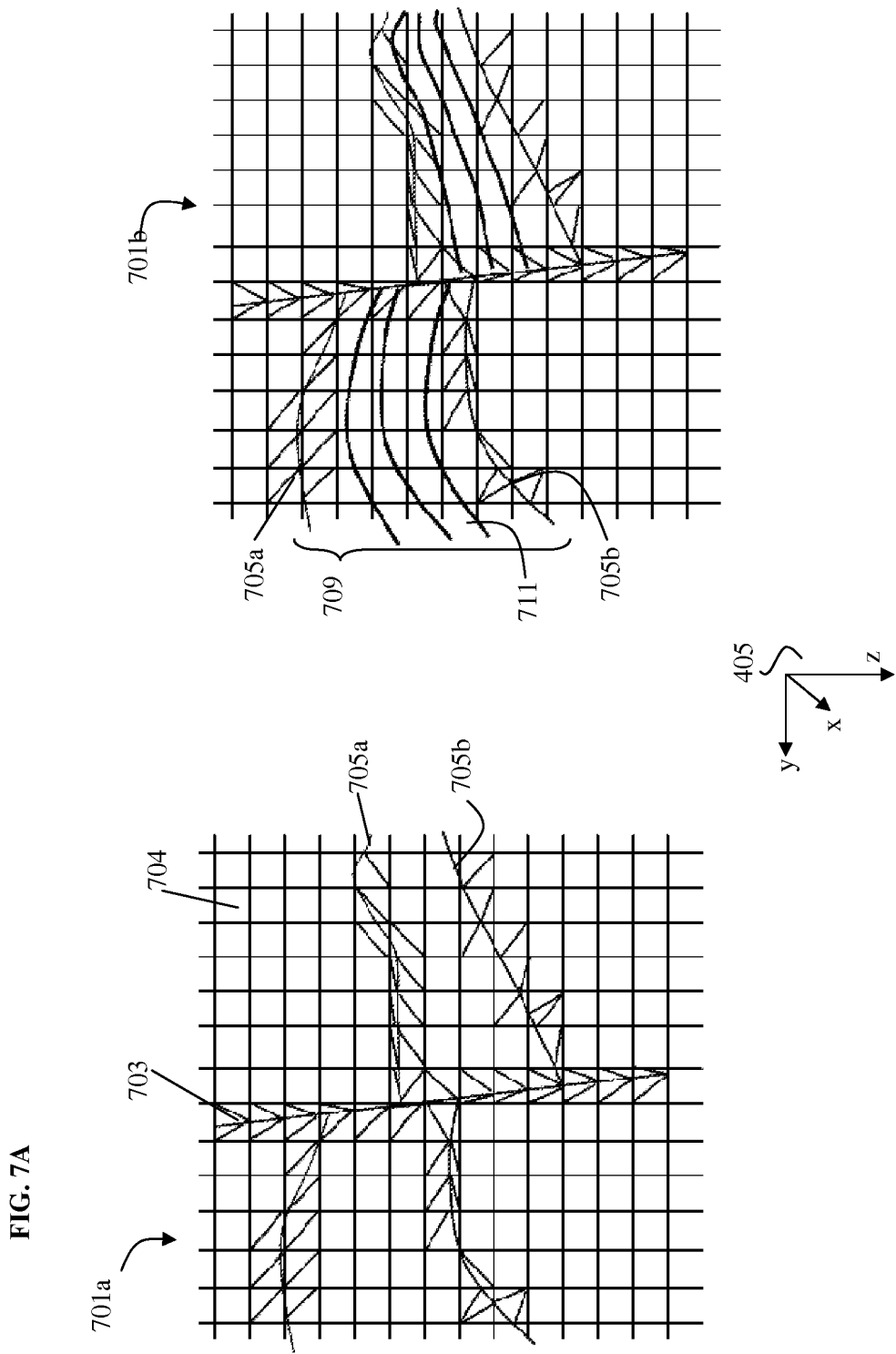

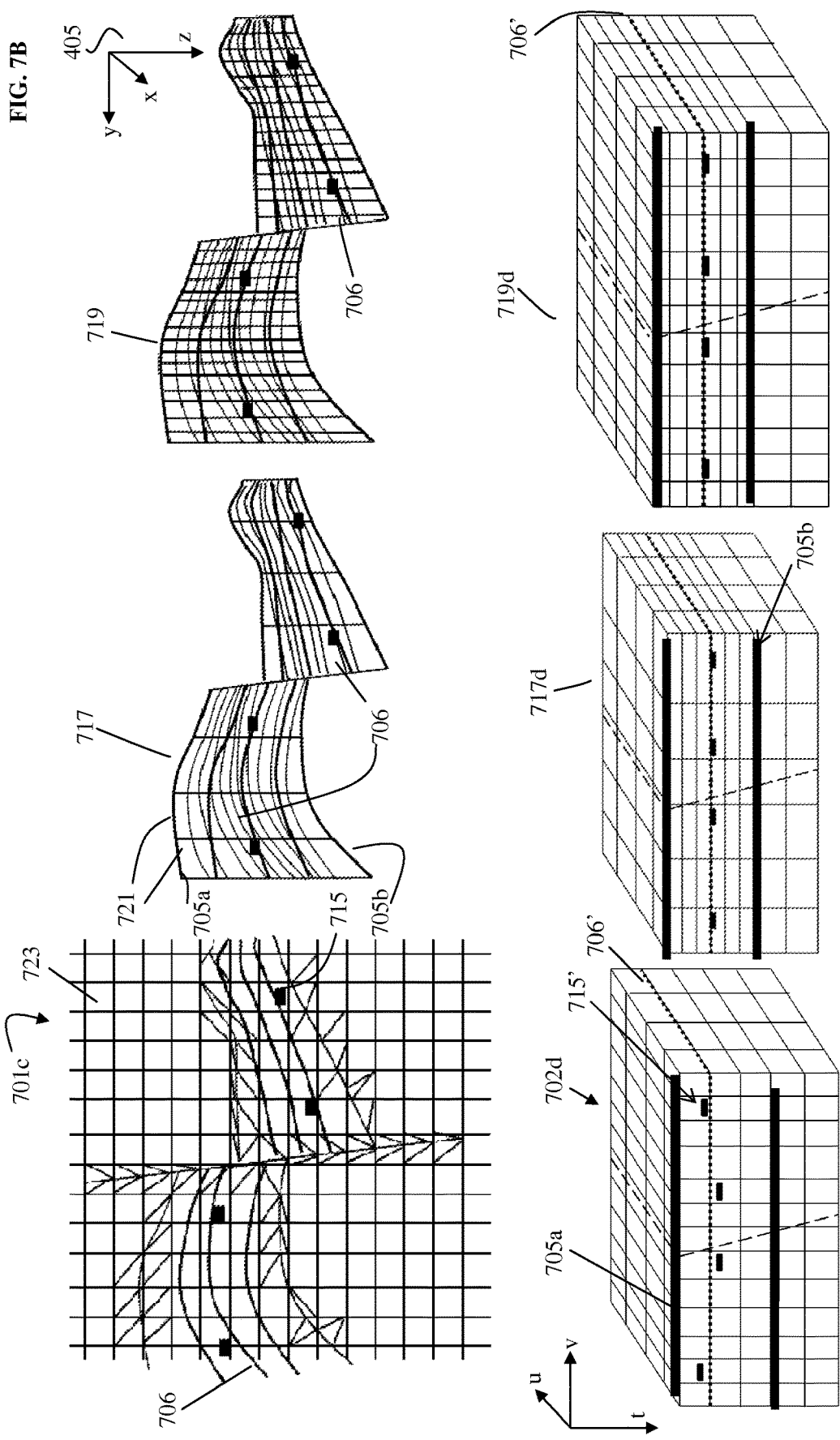

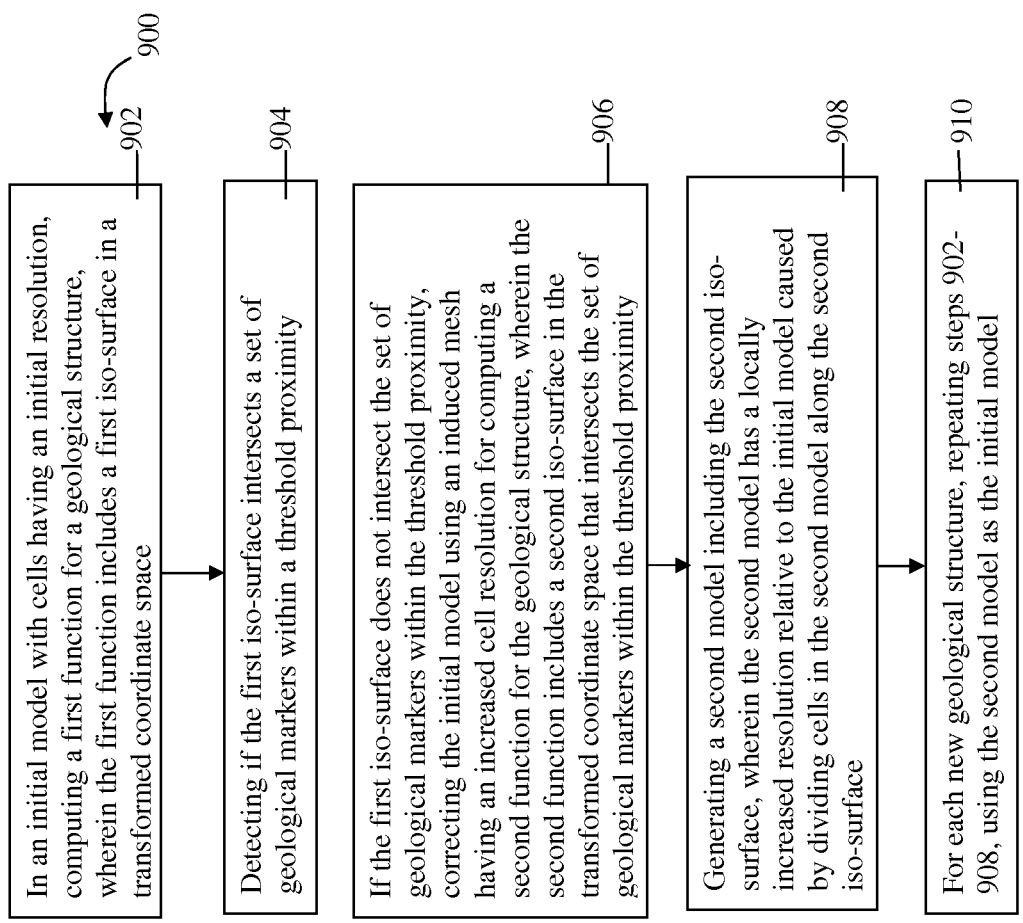

SYSTEMS AND METHODS OF MULTI-SCALE MESHING FOR GEOLOGIC TIME MODELING

CROSS REFERENCE TO RELATED APPLICATIONS

This application claims the benefit of U.S. Provisional Patent Application No. 61/896,760 filed on Oct. 29, 2013 which is incorporated herein by reference in its entirety.

FIELD OF THE INVENTION

Embodiments of the invention pertain to the field of modeling subsurface terrains. In particular, embodiments of the invention pertain to modeling the subsurface at a geological time of the subsurface terrains.

BACKGROUND OF THE INVENTION

Erosion and tectonic activity through geological-time may transform an initially uniform stratified terrain composed of a continuous stack of level surfaces to a terrain fractured by faults forming discontinuities across the originally continuous horizons. To gain insight into the current models, some systems may generate predicted models of the original time of deposition. Scientists may prefer to work with the depositional time model due to its generally simple flat and continuous depositional layers.

SUMMARY OF THE INVENTION

Embodiments of the invention may model the subsurface of the Earth as it was at a geological time, e.g., $T(x,y,z)$, estimating or predicting the state of the subsurface at a (past, relative to the present geologic era) time when the particles of sediment at each location were originally deposited. A model may include functions, e.g., $U(x,y,z)$, $V(x,y,z)$, $T(x,y,z)$, that describe the transformation of geological structures observed in a current time to the time of original deposition. Geological structures such as horizons that are faulted, non-continuous, folded or otherwise deformed in the current geological time model, may be continuous planar iso-surfaces in the past depositional model.

In geo-modeling, multiple types of data may be used including geological markers (well markers or any interpreted or generated geological features) (relatively sparser and typically more accurate) and seismic data (relatively denser but typically less accurate). Geological structures may be initially generated based on only the seismic data and are incorporated or inserted iteratively into the model to update and, for example, improve the accuracy of the model. One or more new geological structures may be inserted in each iteration. A first function, e.g., $T_1(x,y,z)$, may be computed for each geological structure to generate a first set of one or more iso-surfaces e.g., iso-$t_1$ surfaces, approximating the position of geological structure at a depositional time. When computing the first function, e.g., $T_1$, both seismic data and markers may be used.

An accurately modeled horizon may be one that a) matches all the markers b) does not deviate from the seismic data and c) is substantially smooth. To test the accuracy of (a) the markers, the locations of one or more geological markers, which are measured and therefore more accurate, may be compared to the locations of the modeled iso-surfaces generated based on the seismic data. If the first set of iso-surfaces, based on seismic data, intersects the geological markers within a threshold proximity, the first set of iso-surfaces may be verified and fixed in the model. However, in some cases, the seismic data is inaccurate or the resolution of the initial model may be too coarse for an iso-surface to intersect the geological markers. For example, a geological marker may be located within a mesh cell sandwiched between two iso-surfaces aligned with opposite faces of the cell. If one or more of the first iso-surfaces do not intersect the geological markers within the threshold proximity, an error or difference of the modeled iso-surfaces to the measured geological markers may be corrected to refine the first function and improve the accuracy of the location of the geological structure in the initial model.

To correct the initial model, the model may be refined by re-computing the function of the geological structures on a separate mesh, for example, constructed based on $T_1$, called an induced or adaptive mesh to generate a second function that includes a new set of one or more iso-surfaces that intersect the geological markers. In one embodiment, a temporary mesh with an anisotropically increased or decreased resolution (e.g., greater or fewer iso-surfaces in one dimension) may be used for computing a second function, e.g., $T_2(x,y,z)$, for the geological structure. The second function may have a second set of iso-surfaces, e.g., iso-t2 surfaces, that are closer to the geological markers. The anisotropic refinement of the model may be repeated, e.g., N times to generate an Nth function, e.g., $T_N$, until the N set of one or more iso-surfaces intersect the geological markers. When the Nth set of iso-surfaces has a location that substantially matches the locations of the geological markers within the threshold proximity, the location of the geological structure modeled by the second iso-surface may be verified as accurate. This process may be iteratively repeated for each new geological structure using the updated model as the initial model in each successive iteration.

Some embodiments of the invention may iteratively or repeatedly refine a geometric mesh modeling the geological time T to iteratively or repeatedly increase the resolution of the mesh cells or units (e.g. decrease the volume of subsurface particles represented by each or an average mesh cell). Geological data may be incorporated into the mesh during an iteration in which the resolution of the mesh is commensurate or associated with the scale of the geological structure (e.g. a dimension or size of the geological structure is greater than, equal to, or within a range of the dimension or size of an edge of cells in the mesh). In each successive iteration, as the resolution of the mesh increases, the size or smallest dimension of geological structures modeled by each mesh cell along at least one dimension (e.g. the thickness of a geological layer between two horizons) may decrease and accordingly, the geological data incorporated into the mesh may represent geological structures having sizes that also decrease.

BRIEF DESCRIPTION OF THE DRAWINGS

The principles and operation of the system, apparatus, and method according to embodiments of the present invention may be better understood with reference to the drawings, and the following description, it being understood that these drawings are given for illustrative purposes only and are not meant to be limiting.

FIGS. 7A and 7B are schematic illustrations of current and depositional models for multiple seismic horizons, for example, showing how the modeled geological horizons at different scales are stored efficiently on a single mesh, according to embodiments of the invention;

FIG. 9 is a flowchart of a method, according to embodiments of the invention.

Figure 1:
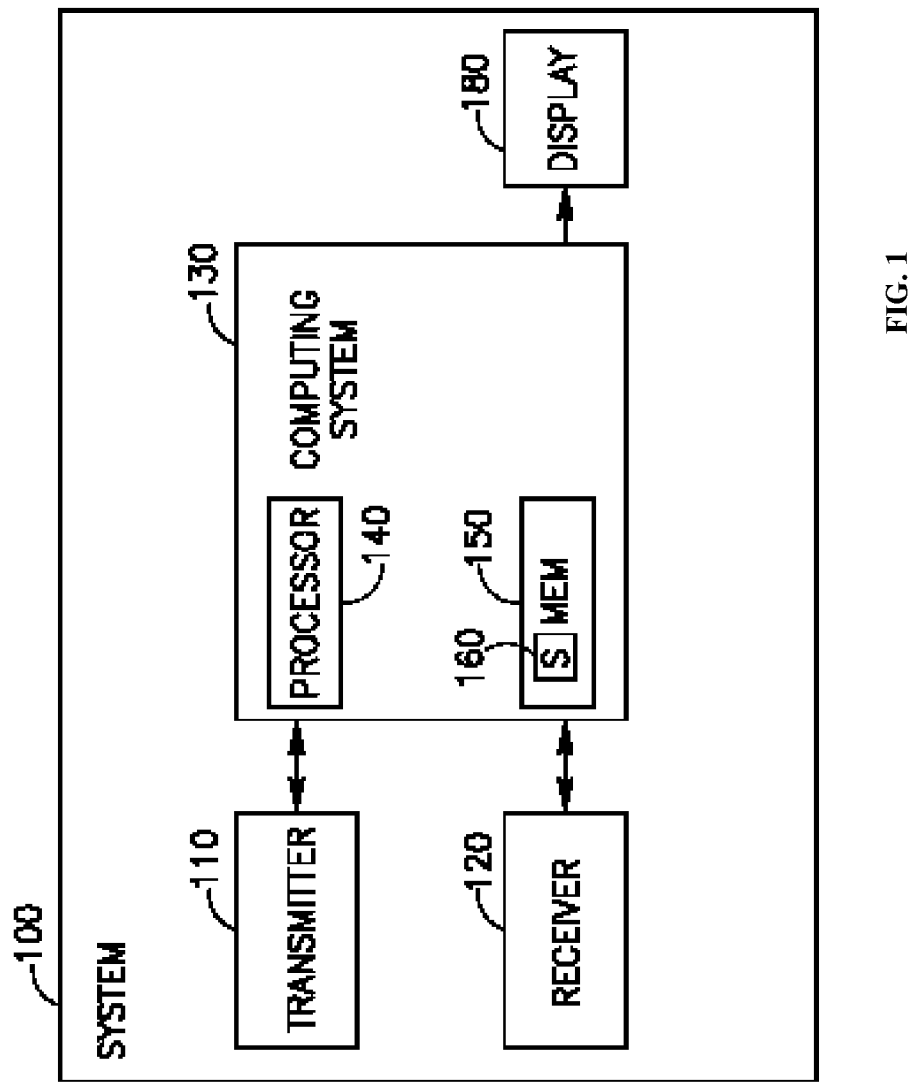
FIG. 1 is a schematic illustration of a system according to embodiments of the invention.

For simplicity and clarity of illustration, elements shown in the drawings have not necessarily been drawn to scale. For example, the dimensions of some of the elements may be exaggerated relative to other elements for clarity. Further, where considered appropriate, reference numerals may be repeated among the drawings to indicate corresponding or analogous elements throughout the serial views.

DETAILED DESCRIPTION OF THE INVENTION

In the following description, various aspects of the present invention will be described. For purposes of explanation, specific configurations and details are set forth in order to provide a thorough understanding of the present invention. However, it will also be apparent to one skilled in the art that the present invention may be practiced without the specific details presented herein. Furthermore, well known features may be omitted or simplified in order not to obscure the present invention.

Unless specifically stated otherwise, as apparent from the following discussions, it is appreciated that throughout the specification discussions utilizing terms such as "processing," "computing," "calculating," "determining," or the like, refer to the action and/or processes of a computer or computing system, or similar electronic computing device, that manipulates and/or transforms data represented as physical, such as electronic, quantities within the computing system's registers and/or memories into other data similarly represented as physical quantities within the computing system's memories, registers or other such information storage, transmission or display devices.

In order to construct a subsurface model, the geometry of the model may be adjusted to fit the geology of subsurface structures and geological markers experimentally observed or detected. The geology of the subsurface structures has been deposited through time (e.g. over millions of years) and may be viewed simultaneously at multiple scales (e.g., basin scale (hundreds of kilometers), reservoir scale (kilometers), depositional event scale (10-100 meters (m)), outcrop scale (m), rock fabric scale (centimeters)). This layering of depositions may be modeled by a geological time (e.g. the geological time representing a vertical or azimuth axis of the model), which may be represented by one or more implicit functions that are computed for each geological sequence of stratified depositional layers. This implicit function may be computed on nodes of a two- or three-dimensional depositional mesh.

Embodiments of the invention may construct or generate recursively the geological time on a multi-scale, multi-resolution mesh, representing the geologic sub-structure at different scales (e.g. a seismic scale modeling faults and horizons and a reservoir scale modeling reservoirs) or levels of detail. Typically, the smaller the scale, the higher the mesh resolution is used (and vice versa). A relatively higher mesh resolution at a relatively higher scale (e.g., modeling relatively larger structures at a relatively higher level of detail) may require higher computational time and memory. Different scales and different resolutions may be used on different dimensions to represent geological structures of varying size. For example, relatively large-scale (e.g., faults) and relatively small-scale (e.g., reservoirs) geological structures may be modeled together using different resolutions, with relatively "coarser" resolutions representing a relatively lower level of detail for large-scale structures and relatively "finer" resolutions representing a relatively higher level of detail for small-scale structures.

The multi-scale mesh may be constructed using a regular grid in which the fault network mesh is inserted, potentially fault by fault or all faults inserted simultaneously, by re-meshing the initial mesh in the vicinity of the fault surfaces. To accommodate the fault network, the mesh may be fractured along surfaces of the faults, splitting regular cells into irregular cells along fault boundaries. The irregular cells may have a different edge dimensions or sizes than the regular mesh causing the seismic scale mesh to have multiple resolutions (a "multi-scale" mesh).

As used herein, "resolution" may indicate a degree of fineness or detail with which an object is represented. In one embodiment, resolution may refer to a model density, e.g., the number of cells per unit of dimension (e.g. length, area or volume). In another embodiment, resolution may describe the length or size of one or more dimensions of the cells. Resolution may be measured globally with respect to the dominant or majority resolution associated with its current iteration. For example, resolution may be measured with respect to the dominant shape, size or type of cells across the global model and may ignore the local multi-scale effects that occur when cells are locally divided by geological structures. For example, the dominant cell type may be a regular polygon such as a prism or a cube. For example, a cubic cell having a resolution of 5 meters may mean that a side or edge of the cubic cell is 5 meters and thus have a volume of 125 $m^3$. In each iterative refinement of the model, the resolution of the model may be increased (e.g. the dimensions of its cells are decreased, such as by a factor of 2 from 200 m to 100 m) locally, and more geological structures with similar resolutions (e.g. the dimensions of the geological structures are greater than or equal to the relatively smaller cell dimensions) and thus are added to the model, thereby increasing model detail. A lower scale geological structure may be added to the model with an initially coarse resolution and the mesh may be further modified to correct errors or add smaller details. The resolution of the mesh may be made finer through the error corrections. In a multi-scale, multi-resolution mesh with multiple resolutions or cell dimensions, the most common dimension or size of the "dominant" cell type in the mesh may be used.

On a mesh, three parametric functions may be computed (e.g. referred to as "U", "V", and "T" functions) to model a predicted state of geological structures simulating their configuration at the geological-time at which they were originally deposited within the Earth. The "T" function may represent the geological or depositional time. The geological time T may be adjusted to fit geological data such as geological markers or seismic events representing the geological layers boundaries. The "U" and "V" functions may be computed to minimize deformation between a depositional (UVT) space simulating the past depositional structures and a current (XYZ) space modeling the current configuration of the subsurface geology. The mesh used to compute the geological scale UVT model may be created from a multi-scale grid constructed from a UVT parameterization of the seismic scale XYZ space model.

Some embodiments for refining model resolution are described herein in reference to a model of a UVT parameterization (e.g. representing a simulated past depositional space); however, the same principles may apply to a model of a XYZ parameterization (e.g. representing a current or present day observed depositional space). An "iso-surface" may refer to a planar surface having a constant value in one of the U, V, or T dimensions in depositional space, or to its non-planar image in the current X,Y,Z space which may be faulted, folded or otherwise deformed.

On modeling geological structures, a first problem encountered by conventional systems, for example at reservoir scale, may be that conventional models may use a tetrahedral mesh (in which all or a majority of cells are tetrahedron having four triangular faces) to capture precise geological structures in this scale. When such precision or resolution is needed at the seismic scale (i.e. over the entirety of the seismic volume) a great amount of computation time and memory may be needed. A second problem may be that, at seismic scale, the (coarse) resolution of conventional meshes (which may, e.g., model structures such as horizons which span horizontally across the x-y plane) is on one hand, not sufficient vertically to model geological structures which are at the reservoir scale described by well data having a higher vertical resolution than the seismic mesh. On the other hand, horizontally, to model layering information coming from geological markers such as wells for which horizontal spacing may be quite large, the modeling computation may use a mesh which is less dense horizontally than the conventional mesh resolution. A third problem is then how to, once the modeling is done, store all these geological structures at different scales into on one final supporting mesh in an efficient way.

Embodiments of the invention may resolve the first problem by solving the parameterization problem by computing the U, V and T functions (in embodiments modelling the X, Y, Z functions, no parameterization is needed or an inverse transformation from the UVT to the XYZ functions may be used) on a regular cubic grid or mesh, for example, and optionally with some tetrahedral cells used to fit already modeled geological structures such as faults and horizons. The use of mostly cubic cells instead of all tetrahedral cells may significantly reduce computational resources. The second problem may be solved by using the UVT parameterization on the seismic scale mesh to create a local induced mesh (e.g. see current model 609, 717) which is an irregular grid induced from the UVT transformation of the initial model 601 or 600a-600c. Induced mesh 609, 717 may have mostly hexahedral cells and some polyhedral cells (for example, tetrahedral), following the boundaries of already modeled geological structures. The axes of the induced mesh include iso-surfaces of the initial model 601 in the depositional space. An irregular grid may include cells whose shapes are not congruent in size and shape, such as a rectilinear grid with hexahedral cells having different volumes. The induced mesh may, for example, have a coarse resolution in the horizontal direction (e.g., in the u- and v-dimensions) and a fine resolution in the vertical direction (e.g., in the t-dimension). The U, V and T parameterization functions may be solved again on the induced mesh. The third problem may be solved by building a global induced mesh that merges both scales (e.g., the seismic scale and the reservoir scale which may more closely model geological structures) (e.g. see current model 719 in FIG. 7B), on which an updated U, V, and T may again be computed. The merged mesh may have, for example a horizontal resolution equivalent to the regular cubic grid and a fine resolution vertically in order to capture more details. The merged mesh may further include different resolutions in different local areas, depending on the geological structure modeled in each local area.

Embodiments of the invention may receive geological data representing a current or observed configuration of faults and horizons, e.g., at a current geological time (such as, within the past several to tens of thousands of years). The current or observed data may be represented, e.g., by the X, Y, Z functions, or by a group of points in (x,y,z) coordinates. The geological data may be transformed or converted to a depositional model representing an estimated state of the subsurface structures at a prior geologic time period. The depositional data may be represented, e.g., by the U, V, T functions, or by a group of points in (u,v,t) coordinates. For example, a prior geologic time period may be when the subsurface structure was originally formed (e.g., a depositional time period such as millions or billions of years ago), may be as recent as hundreds of thousands of years ago, or may be a time that is intermediate between the recent geologic time period and a depositional time period. The geological data or transformed geological data may be represented by a mesh of cells. The mesh of cells may be divided or cut by iso-surfaces to generate a plurality of sub-meshes at a greater resolution, where each cell may describe or represent a smaller volume or size of geological structure. An iso-surface may be a surface having the same or a constant value for one dimension across all values of other dimensions. For example, iso-u, iso-v, and iso-t surfaces may have the same respective (u), (v), and (t) values on every point on their respective planes. The sub-meshes may be further divided into sub-mesh parts or sub-mesh cells having, for example, irregularly shaped polyhedrons such as tetrahedrons. A mesh may be described by its resolution, where a greater resolution mesh is made up of a greater number of cells, the majority of which have a smaller size or volume compared to cells of a mesh having a smaller resolution. Mesh cells and sub-mesh parts in the depositional model may be inverse transformed to generate a current model to represent the current configuration of the faults and horizons using inverse transformed polyhedron sub-mesh parts or inverse transformed mesh cells. The current model may be visualized using the inverse transformed mesh cells or sub-mesh parts. For example, hexahedral cells in depositional space may be defined by iso-t, iso-u, and iso-v lines that are straight and orthogonal to each other. In a visualization of the current model, the inverse transformed hexahedral cells bound by iso-t, iso-u, and iso-v lines may appear curvilinear. Mesh cells in the depositional model may be updated or changed to a greater resolution that represents a smaller volume or area of geological structures, and mesh cells may be updated or changed to conform to different geological structures. The updated mesh cells in the depositional model may affect the appearance of iso-t, iso-u, and iso-v lines in the visualization of the current model.

Embodiments of the invention may start by receiving geological data from a receiver and generating or transforming the geological data to a first depositional model, based on, for example, an initial cubic mesh representing the received geological data at a depositional time. In one example, all or a majority of mesh cells at the depositional time may be cubic (each cell having six square faces) or rectangular (each cell having six rectangular faces). Other regular shapes may be used in the initial mesh, including any N-facetted polyhedron. "Regular" shapes may have equal angles between pairs of opposing faces or sides in a polyhedron. The initial mesh may have a first dominant resolution (e.g. each cubic cell of the mesh may represent a volume of approximately $(200 \text{ m})^3$ of subsurface terrain) and no alignment to any geological data. Geological data, for example, representing geological structures or features of a first size or scale greater than or equal to the cell size of the first resolution may be inserted or incorporated into the initial mesh. For example, since the cell size associated with the first resolution may be substantially large (e.g. $(200 \text{ m})^3$), geological structures smaller than a single cell (e.g. <200 m in length) may not be able to be accurately modeled and only geological structures larger than or equal to the cell size (e.g. ≥200 m in length), such as faults, may be modeled. The mesh cells and model may represent an estimated configuration of a first set of geological structures at depositional time by adjusting the cell boundaries to conform or align with the geological structures, such as one or more faults or fault networks, which are greater than or equal to the dimensions or size of the cells. A first depositional model, e.g., a model derived from the geological data to a model representing a predicted state of geological structures at a prior geological time period, may be generated or transformed using the initial cubic mesh. The first set of geological structures may be transformed to a mesh configuration representing a prior geological time period, such as a million years ago.

The first depositional model may be updated or restructured to align with the described geological structures (e.g., to intersect or align with the geological markers) and the geological time T, as well as the U and V functions, may be optionally updated to conform, align, coincide, or fit together with the geological structures. Cells in the initial mesh that intersect with the first set of geological structures (e.g., a fault network), may be converted to a sub-mesh of irregular sub-mesh parts. The sub-mesh parts may be polyhedrons with at least one facet approximating the orientation of the first set of geological structures, e.g., at least one facet of a polyhedron sub-mesh part may be in a plane that is nearly parallel to a fault's plane. Sub-meshes that are intersected by faults may have multiple polyhedron sub-mesh parts, or, if a fault only partially intersects the sub-mesh (e.g., referred to as a "dying faults"), may have one concave (partially cut or fractured) sub-mesh. Thus, the initial mesh at depositional time may, for example, be a hexahedron-dominant grid with some tetrahedral or irregularly polyhedral cells, for example, along the boundaries of subsurface structures. The restructured or re-computed depositional model may be used to update or re-parameterize the time function T' and/or the paleo-geological coordinates U' and V' to conform to the new geological structures incorporated at the first resolution. For example, T, U, and V functions may be initially computed using an initial mesh or initial parameters. T', U', and V' may be updated or re-computed using a new mesh or new parameters based on newly incorporated geological structures. The T, U, and V functions may be generated or updated from the hexahedron-dominant grid (in current (XYZ) space) using a discrete-smooth-interpolation (DSI) method which may interpolate or approximate values of a function at nodes of a mesh while honoring a given set of constraints, such as the incorporated geological structures. Further description of the DSI method may be found for example in U.S. Pat. No. 8,600,708, which is incorporated by reference herein. Other interpolation or approximation methods may be used.

The first depositional model may be updated to create or be transformed into a second depositional model using a second mesh in UVT space having a second higher resolution (e.g. greater number of cells and/or cells with smaller dimensions) providing greater detail than the initial mesh (e.g. each mesh cell of the second mesh may represent $(5 \text{ m})^3$ of subsurface terrain). Geological data, for example, representing relatively smaller geological structures of a second scale (e.g. between 5-200 m in length or width or height) may be incorporated into the second mesh to include cells at the second resolution which represent an estimated configuration of a second set of geological structures at depositional time, such as horizons, for example. The horizons or other unconformities may be larger than or equal to the cell edges at the second resolution (e.g., larger than 5 m) and smaller than the cell edges at the first resolution (e.g., smaller than 200 m). Other scales or dimensions of cell edges may be used for each resolution, such as 50 meters or a mile, for example. The second mesh in the depositional model may similarly be updated or restructured where its cells that intersect with the second set of geological structures (e.g., a set of horizons), may be converted, altered, or transformed to a sub-mesh comprising polyhedron sub-mesh parts. The polyhedrons may be tetrahedral, for example, with at least one facet approximating the orientation of the second set of geological structures. The time function T" and/or the paleo-geological coordinates U" and V" may again be updated, refined or re-generated to create or be transformed into a second depositional model that conforms to the new geological structures incorporated into the second mesh at the second resolution. An updated second current model may be derived by inversely transforming the second depositional model.

In each successive iteration, as the resolution of the mesh increases, the size of geological structures modeled by each mesh cell along at least one dimension may decrease. For a three-dimensional geological structure, the resolution of a mesh may decrease in the geological structure's smallest dimension. For a geological layer, for example, the thickness t of a geological layer between two horizons may be the smallest dimension (e.g. its t-dimension in (u,v,t) space). To include more details between the two horizons, or to include more horizons, iterations of the mesh may increase resolution in the t-dimension only, or in more dimensions. In general, increasing the resolution of a mesh does not require increasing the resolution of the mesh cells in every direction (e.g., a cubic or rectangular cell's dimensions may not decrease in every dimension). Thus, the resolution of the mesh along a first iso-surface may be different from the resolution of the mesh along a second iso-surface normal or substantially normal to the first iso-surface. In depositional space, for example, a mesh's increased resolution may be greater in the t-dimension than in the u- or v-dimension.

According to one embodiment of the invention, each iteration of the iterative modeling process may include, for example (other operations or orders of operations may also be used):

Increase the resolution of the depositional mesh by dividing the cells so that cells of the mesh have a dimension less than a first value or threshold, which may, for example, refer to a specific volume or dimension (divide all regular and/or irregular cells to decrease the dominant size or dimensions of the majority or dominant type of cells). (In the first iteration, an initial regular cubic mesh having an initial resolution is generated and this step may be skipped.) The division or increase in resolution may be global (e.g. dividing cells along iso-surfaces, such as, iso-t surfaces, spanning the entire length or dimension of the model). Such a global division may apply to every cell in the mesh along that iso-surface. In contrast, when geological structures are added, the division may occur at points of interest, e.g., locally around a particular horizon. Divisions may be termed local since they may only occur in the near vicinity of the subsurface structures and may not be applied to every cell along an iso-surface.

Incorporate subsurface structures into the depositional model that have a dimension greater than or equal to a predetermined value (e.g. ≥the dimension of an individual mesh cell of a dominant size/type), or incorporate geological markers having distances between them greater than a predetermined value.

Generate an updated mesh that fits the incorporated subsurface structures or geological markers.

Re-compute the parameterization T (and/or paleo-geographic coordinated U and V) for that mesh The iterative process may iterate or repeat one or more (N) times according to the precision or resolution desired (the first step may be skipped in the initial iteration and the final step may be skipped in the final Nth iteration if the output model is in X, Y, Z space).

After N repetitions of this process, an Nth depositional model may be determined from an Nth mesh that includes cells at an Nth resolution greater than the resolution of a previous depositional model. The cells at the Nth resolution may represent an estimated configuration of an Nth set of geological structures greater than or equal to the size or dimensions of the cells at the Nth resolution. In each subsequent iteration, geological data associated with relatively smaller structures (e.g., wells and reservoirs, for example) may be added and the resolution of the mesh may be increased for creating a more accurate geological UVT model (or, XYZ). For example, an Nth mesh may include cells at an Nth resolution, which may be greater than the an N-1, N-2, ..., and $1^{st}$ resolutions. The cells may thus be smaller in size or volume than the cells in the N-1, N-2, ..., and $1^{st}$ depositional models, such as for example 3 cubic meters ($m^3$). An Nth depositional model may be re-computed from the Nth mesh, and an Nth current model may be determined by the inverse transformation of the Nth depositional model. A plurality of iterations may be executed or occur, where each subsequent iteration defines an increased resolution for a mesh in the depositional model, until a final Nth resolution is achieved. The number N of iterations or repetitions may be for example set to a predetermined number, determined dynamically and automatically (e.g. the iterative process ending when the geological time T function asymptotically approaches a stable result) or selected by the user. A stable result may exist, for example when a variation between the model and a previous iteration of the model is less than a threshold. The variation may be computed by, for example, determining the sum of squared differences between the model and a previous iteration. As the resolution is increased, the variations between two consecutive iterations may decrease and thus approach stability. Other values that represent a variation between model iterations may be used. Each intermediate 1, ..., N-1 model or every M intermediate models 1, M, 2M, ... may be displayed to a user for inspection to determine whether or not to iterate the process. A processor may display or cause to be displayed a final Nth depositional model including geological structures added in each of the N iterations, or the processor may display the inverse transform of the final Nth depositional model. The final resolution may be the last resolution used by the last iteration and may be achieved, for example, when all subsurface structures represented by geological data are incorporated into the model.

According to embodiments of the invention, a model of geological structures may be iteratively generated by locally increasing the cell resolution of a mesh in areas that intersect with the geological structures. For example, a system (e.g., system 100 in FIG. 1) may receive data describing a plurality of geological structures in a current or observed time period. The plurality of geological structures may be added to a model, one by one. An initial model, using a mesh of cells at an initial resolution, may be defined in (x,y,z) space (the original current time space or inversely transformed from the depositional (u,v,t) space). To add a first geological structure to the model, such as a horizon, a first function may be computed which includes a first iso-surface in a depositional time period. Since the resolution of the initial mesh may be initially coarse, the first function describing the horizon may not align properly with geological markers. Geological markers may be data that accurately or more precisely describe locations where a horizon or other geological structure was measured. Embodiments of the invention may correct the modeled geological structures so that they substantially coincide or intersect with the geological markers.

Embodiments of the invention may be executed using a computing system, for example, as described in reference to FIG. 1.

Reference is made to FIG. 1, which schematically illustrates a system 100 in accordance with an embodiment of the present invention.

System 100 may include a transmitter 110, a receiver 120, a computing system 130 and a display 180.

Transmitter 110 may transmit output signals, for example, acoustic waves, compression waves or other energy rays or waves, that may travel through subsurface (e.g., below land or sea level) structures. The transmitted signals may become incident signals that are incident to subsurface structures. The incident signals may reflect at various transition zones or geological discontinuities throughout the subsurface structures. The output frequency, wavelength and intensity of the seismic signals by transmitter 110 may be controlled by a computing system, e.g., computing system 130 or another computing system separate from or internal to transmitter 110.

Receiver 120 may accept reflected signal(s) that correspond or relate to incident signals, sent by transmitter 110.

Computing system 130 may include, for example, any suitable processing system, computing system, computing device, processing device, computer, processor, or the like, and may be implemented using any suitable combination of hardware and/or software. Computing system 130 may include for example one or more processor(s) 140, memory 150 and software 160. Data generated by reflected signals, received by receiver 120, may be transferred, for example, to computing system 130. The data may be stored in the receiver 120 as for example digital information and transferred to computing system 130 by uploading, copying or transmitting the digital information. Processor 140 may communicate with computing system 130 via wired or wireless command and execution signals. Computing system 130 or processor(s) 140 may be configured to carry out embodiments of the present invention by, for example being connected to memory 150 and executing instructions or software stored in memory 150.

Memory 150 may include cache memory, long term memory such as a hard drive or disk, and/or external memory external to processor 140, for example, including random access memory (RAM), read only memory (ROM), dynamic RAM (DRAM), synchronous DRAM (SD-RAM), flash memory, volatile memory, non-volatile memory, cache memory, buffer, short term memory unit, long term memory unit, or other suitable memory units or storage units. Memory 150 may store instructions (e.g., software 160) which when executed perform embodiments of the invention, and data. Data may include, for example, raw seismic data collected by receiver 120, instructions for partitioning a three dimensional (3D) mesh, grid or other arrangement into polyhedron, instructions for building a model, instructions for parameterizing, converting or transforming (and inverse transforming) a model between a current geological model and a past depositional model, instructions for parameterizing or generating a geological time T, or other instructions or data. When discussed herein, manipulating geological data, such as the operations for calculating, forming, refining, aligning, etc., cells or sub-meshes, may involve the manipulation of data stored in a memory which represents the corresponding geological structures, the cells, sub-meshes, sub-mesh parts, horizons or faults.

Processor 140 may include a local or internal memory, such as a cache memory, for relatively fast access to data, e.g., as compared to memory 150.

Input device(s) may include a keyboard, pointing device (e.g., mouse, trackball, pen, touch screen), or cursor direction keys, for communicating information and command selections to processor 140. Input device may communicate user direction information and command selections to processor 140. For example, a user may use input device to set or select a number of iterations of the refinement process, set or select a final scale/resolution desired for the final iteration or output model, select a button (e.g., manipulate a pointing device such as a mouse to select an on-screen display of a button or other user interface item) to increment the process one iteration at a time to view the model at each iteration e.g. until the user is satisfied with the result, edit, perform geometrical computations, highlight models, etc. In another example, a final resolution of a mesh may be achieved after a number of iterations selected by a user. A display 180 monitor may output a visualization or model image of the user-commanded operations executed by processor 140.

Display 180 may display data from transmitter 110, receiver 120 or computing system 130. For example, display 180 may display visualizations of subsurface models including a current model (e.g., current model 104 of FIG. 2), an original depositional model (e.g., depositional model 106 of FIG. 2), an initial current model (e.g., model 601 of FIG. 6A, model 701a of FIG. 7A, model 701c of FIG. 7B), an induced model (e.g., model 609 of FIG. 6A, model 717 and/or 719 of FIG. 7B), a second current model (e.g., model 618 of FIG. 6A, model 701b of FIG. 7A), an initial depositional model (e.g., model 600a of FIG. 6B, model 705a of FIG. 7B), a depositional induced model (e.g., model 600b of FIG. 6B, model 717 of FIG. 7B), and/or a second depositional model (e.g., model 600c of FIG. 6B, model 719d of FIG. 7B).

Figure 2:
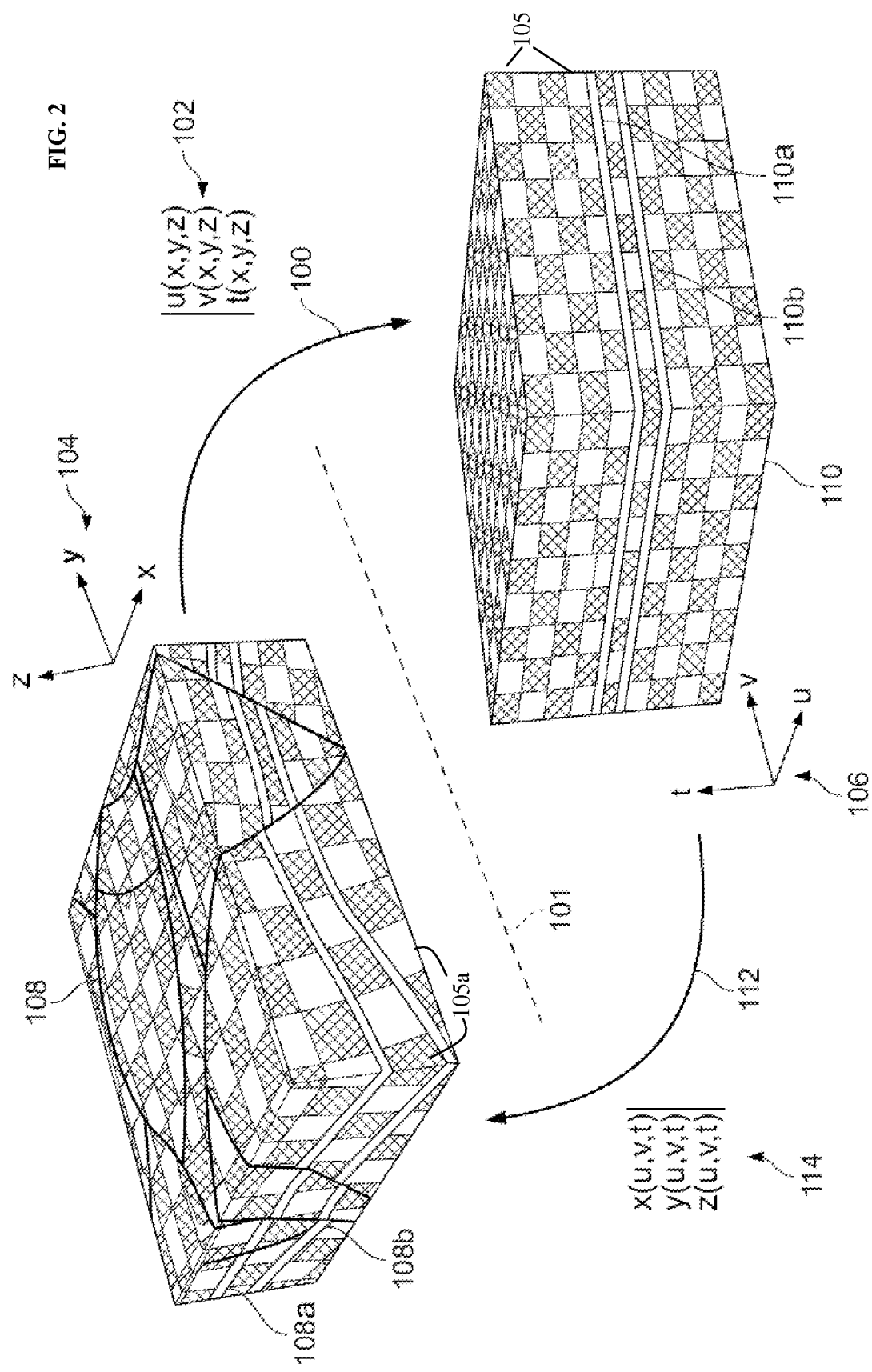
FIG. 2 is an illustration of a transformation between a current model and an original depositional model according to embodiments of the invention.

Reference is made to FIG. 2, which schematically illustrates a transformation, map or conversion between a current model 104 and an original depositional model 106 (separated by dashed line 101).

Current model 104 may represent the current modeled locations of subsurface structures including particles of sediment in the terrain (typically at a granularity larger than that representing each particle). Current model 104 may be a 3D model in a Cartesian (x,y,z)-space, where the location of each particle is represented by the coordinates (x,y,z), where (x,y) may describe the geographical coordinates of the particle (e.g., latitude and longitude) and (z) may describe the altitude or distance below or above a surface level.

Depositional model 106 may represent estimated or predicted (past) locations of particles of sediment at the time when the particles were originally deposited. Depositional model 106 may be a 3D model in an (u,v,t)-space, where each particle may be represented by the coordinates (u,v,t) where (t) may be the geological-time of deposition of the particle and (u,v) may be the paleo-geographical coordinates of the particle at geological-time (t).

The "forward" or "direct" transformation 100 may be defined by functions 102 $\{u(x,y,z),v(x,y,z),t(x,y,z)\}$, which convert or transform each point (x,y,z) of current model 104 to a point $\{u(x,y,z),v(x,y,z),t(x,y,z)\}$ of depositional model 106. The forward transformation 100 may be represented, for example, as follows:

$$(x, y, z) \xrightarrow{UVT} \{u(x, y, z), v(x, y, z), t(x, y, z)\} \qquad [1]$$

The forward transformation or conversion 100 transforms each horizon H(t) (e.g., 108a or 108b) of current subsurface structure 108, in current model 104, into a level horizontal plane H*(t) (e.g., 110a and 110b, respectively) of depositional structure 110 in depositional model 106. In depositional model 106, horizons 110a and 110b of structure 110 are simply the images of the level surfaces of the function t(x,y,z) representing the geological-time at location (x,y,z). That is, since a horizon models a set of particles of sediment that was uniformly deposited in time, each horizon is constant at the time when the particles modeled thereby were originally deposited (e.g., in depositional model 106). Therefore, each horizon 110a and 110b in depositional model 106 may be planar and uniquely defined by a single time, (t), e.g., an iso-t surface.

Conversely, the "inverse" or "reverse" conversion or transform 112 may be defined by functions 114 $\{x(u,v,t), y(u,v,t), z(u,v,t)\}$, which transform each point (u,v,t) of the depositional model 106 to a point $\{x(u,v,t), y(u,v,t), z(u,v,t)\}$ in current model 104. The inverse transformation 112 may be represented, for example, as follows:

$$(u, v, t) \xrightarrow{UVT^{-1}} \{x(u, v, t), y(u, v, t), z(u, v, t)\} \qquad [2]$$

Using the forward transform or conversion 100, e.g., defined in equation (1), and the inverse transform 112, e.g., defined in equation (2), any geological property may be modeled in one of the two models (current model 104 or depositional model 106) and the result of the property modeled in the one space may be transferred to the other space (depositional model 106 or current model 104, respectively). In practice, a geological property is typically modeled in the space where modeling the property is the simplest. For example, horizons may be modeled in depositional model 106 where they have a simple flat planar form. Faults may be modeled first in current model 104 since they did not exist in the original depositional time, and may then be transformed to depositional space, to model their interaction with the planar horizons in depositional model 106.

As shown in FIG. 2, depositional model 106 may be a mesh of cells 105 that conform to geological structures, such as horizons 110a and 110b. The cells 105 may be bounded or defined by iso-t planes or surfaces which have the same t-value at every point on the plane. The cells 105 may further be bounded or defined by iso-u and iso-v planes that have the same respective (u) and (v) values on every point on their respective planes. The mesh of cells in the depositional model 106 may be inverse transformed to the current model 104 in order to visualize the current model 104. The inverse transformation of cells 105 may appear curvilinear (e.g., transformed cells 105a) since they may be bounded by inverse transformed iso-t, iso-u, and iso-v planes. When cells in the depositional model 106 are updated to a higher resolution and to conform to geological structures, their inverse transformation to a current or observed model may also be updated as shown in FIGS. 4, 5, 6A, 7A, and 7B.

Embodiments of the invention may manipulate data representations of real-world objects and entities such as underground geological structures, including faults, horizons and other features. Data received by for example a receiver receiving waves generated by an air gun or explosives may be manipulated and stored, e.g., in memory 150, and data such as images representing underground structures may be presented to a user, e.g., as a visualization on display 180.

Figure 3:
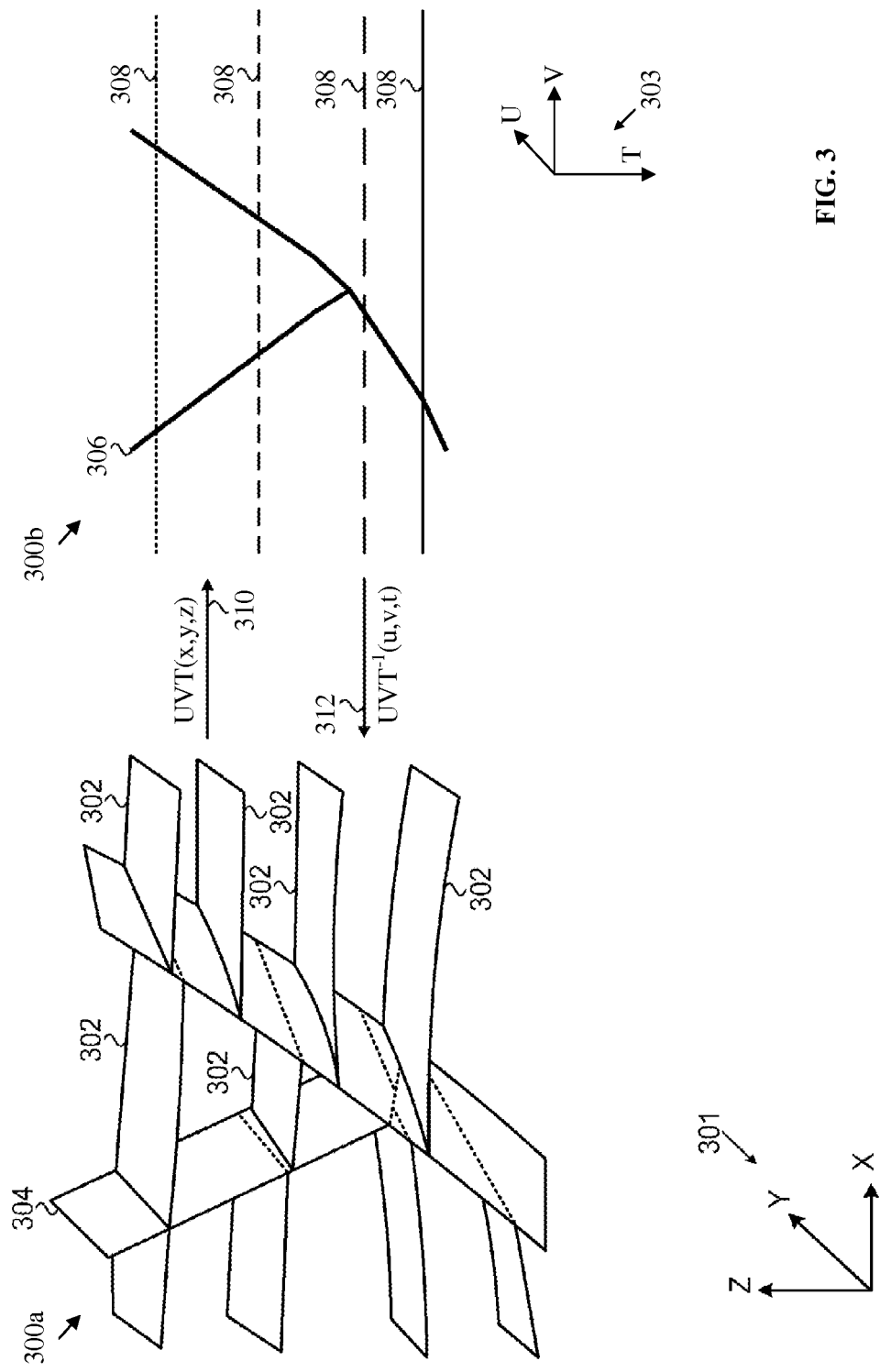
FIG. 3 is an observed configuration of geological structures according to embodiments of the invention.

Reference is made to FIG. 3, which schematically illustrates an observed configuration 300a of geological structures transformed to a deposition model 300b in accordance with an embodiment of the invention. Geological structures may include, for example, a network of horizons 302 and faults 304. Other structures may be included in the geological structures, such as wells or reservoirs or other discontinuities. Observed horizons 302 and faults 304 may represent geological variations and discontinuities as they currently or recently appear in a current geological space 301 (e.g., (x,y,z)-space 114 of FIG. 2), thus the term "observed" indicates that methods of detecting, in the present era, actual existing geologic structure were used. For example, the observed horizons 302 and faults 304 may have appeared in the last several thousand of years. Geological data representing horizons 302 (e.g., horizons 108 of FIG. 2) and faults 304 may be generated, e.g., by computing system 130 of FIG. 1, or received via an input from an external source. The received geological data may be from a database of historical data, for example, or from measured or observed experiments.

Horizon 302 and fault 304 networks of observed structures transformed to horizon 308 and fault 306 networks in a past depositional geological time configuration 300b in accordance with an embodiment of the invention. A conversion or transformation 310 (e.g., UVT transformation 102 of FIG. 2) may be applied to map the current horizon 302 and fault 304 networks to past depositional horizon 308 and fault 306 networks representing the geological structures as they appeared in their past depositional geological space 303 (e.g., (u,v,t)-space 102 of FIG. 2). In the past model, each horizon 308 may be represented as an iso-surface in the time dimension (e.g., since each horizon is deposited at approximately the same geological time, e.g., within tens of thousands of years). An inverse conversion or transformation 312 (e.g., XYZ transformation 112 of FIG. 2) may be applied to map the past depositional horizon 308 and fault 306 networks to their current horizon 302 and fault 304 locations in a current geological space 301 (e.g., (x,y,z)-space 114 of FIG. 2).

Figure 4:
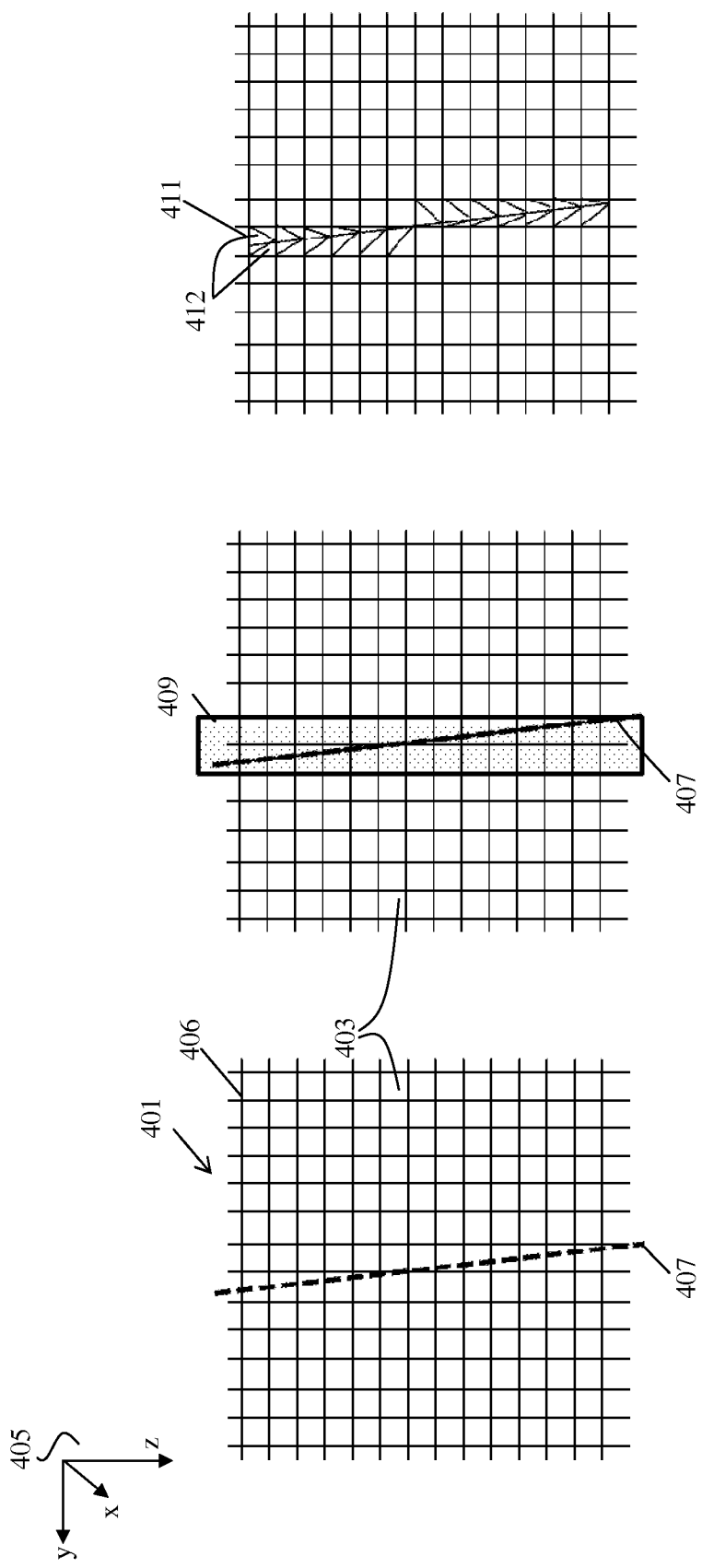
FIG. 4 is a schematic diagram of a first current model, according to embodiments of the invention.

FIG. 4 is a schematic diagram of a first current model 401 for incorporating a fault 407 in to an initial scale mesh 406, according to embodiments of the invention. The first or initial current model 401 may be defined in (x,y,z) space 405 (the original space or inversely transformed from the depositional (u,v,t) space). The first current model 401 may be defined on mesh 406 having a first resolution, for example, including cells 403 that have a first volume, such as, 200 m$^3$. The cells of the first current model 401 may be based on or defined by a regular cubic (or irregular hexahedral) mesh. The first current model 401 may initially have no alignment to geological data. As shown, for purposes of simplifying illustration, the z-axis may be pointed down towards the bottom of the page to represent depth within the geological surface and the x-y plane may be normal to the z-axis.

A first set of current geological structures, such as a fault 407, may be incorporated or inserted into the mesh 406 by dividing or aligning the cells of the cubic or rectangular mesh with an estimated configuration of a first set of current geological structures. The first set of current geological structures may have a scale or size greater than or equal to a first threshold that is at least one of the dimensions (e.g., a face, side, or diagonal) of a single one or more cubic cells 403 (e.g. an uncut, regular or majority/dominant type of mesh 406 cell). The received geological data (e.g., from FIG. 3) may include data that describes more geological structures than the fault 407, but for the first current model 401, the geological data may be filtered or sorted, for example, to first only include structures larger that the size or dimension of the mesh cell 403.

The mesh 406 of the first current model 401 may be aligned with fault 407 and other received geological data, for example, locally inside a volume of interest 409 within mesh 406 (inside the cubes 403 or layer(s) that intersect, overlap, or contain the fault 407). Some or all of the cubic cells in the volume of interest 409 may be divided, cut or aligned by the fault 407 into non-cubic polyhedrons. Each non-cubic polyhedron may include at least one facet approximating the orientation of a geological structure from the first set (e.g., the incorporated or included subsurface structures), such as, the fault 407. For example, cubic cell 411 may be divided into two polyhedral sub-mesh parts or sub-mesh cells 412 by fault 407. A polyhedral sub-mesh part may then be optionally transformed to consist only of tetrahedrons.

Figure 5:
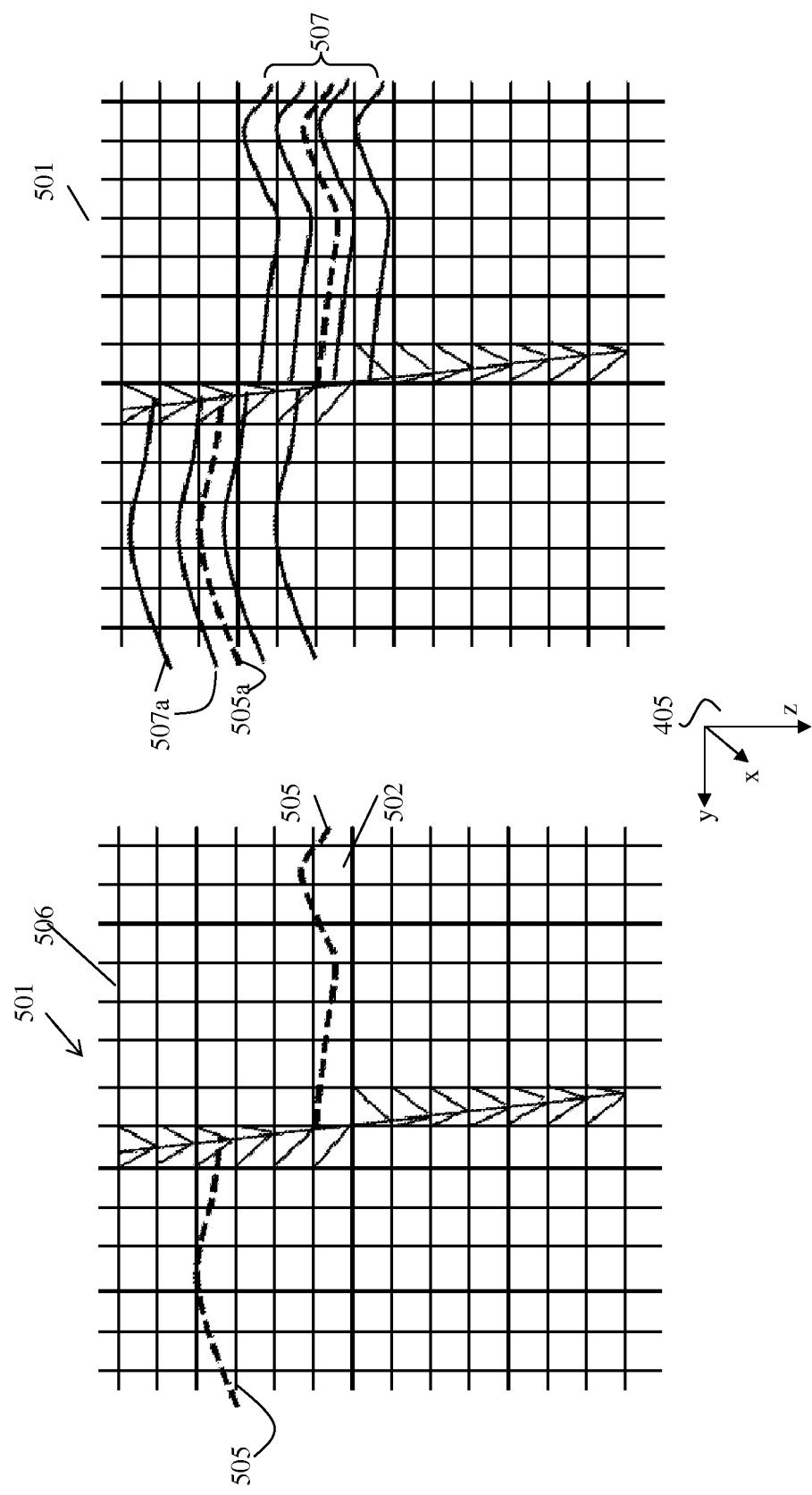
FIG. 5 is a schematic illustration of a second current model, according to embodiments of the invention.

FIG. 5 is a schematic illustration of an updated model 501 for incorporating a horizon 505 into an initial scale mesh, according to embodiments of the invention. The first current model 401 may be updated to a current model 501 that includes a mesh 506 of cells 502. Updated current model 501 may incorporate horizons 505 that have a scale or size greater than the first threshold Like the fault 407 modeled or represented by the first current mesh 401 of FIG. 4, the horizons 505 may have a size or dimension that is greater than at least one of the dimensions (e.g., a face, side, or diagonal) of the model's 501 cells 502.

In the current time model 501, horizons 505 may be curved due to a shift or change in the subsurface bedrock over time (e.g., from a depositional time period to a current time period). However, at a depositional time when the horizons 505 layers were first deposited, all the particles of the single horizon 505 were deposited at approximately the same depositional time (e.g. a period of 1-100 thousand years). Accordingly, horizon 505 may have a substantially constant depositional time value throughout, forming an "iso-t" surface 505a (iso=constant, t=depositional time). In the uvt-space, an iso-t surface is generally flat (e.g. see iso-t surfaces 110a and 11b of FIG. 2). Additional iso-t surfaces or horizons 507a may be extrapolated in parallel to the iso-t surface 505a for the inserted horizon 505. Iso-t lines 507a which are in the local area or vicinity of horizons 505 may have the same or nearly the same curvature as horizons 505 when represented in the current model 501. In some embodiments a local area may be, for example, a threshold or predetermined distance away from a horizon. In other embodiments, a local area may be between two or more horizons. Other kinds of local areas may be defined.

Figure 6A:
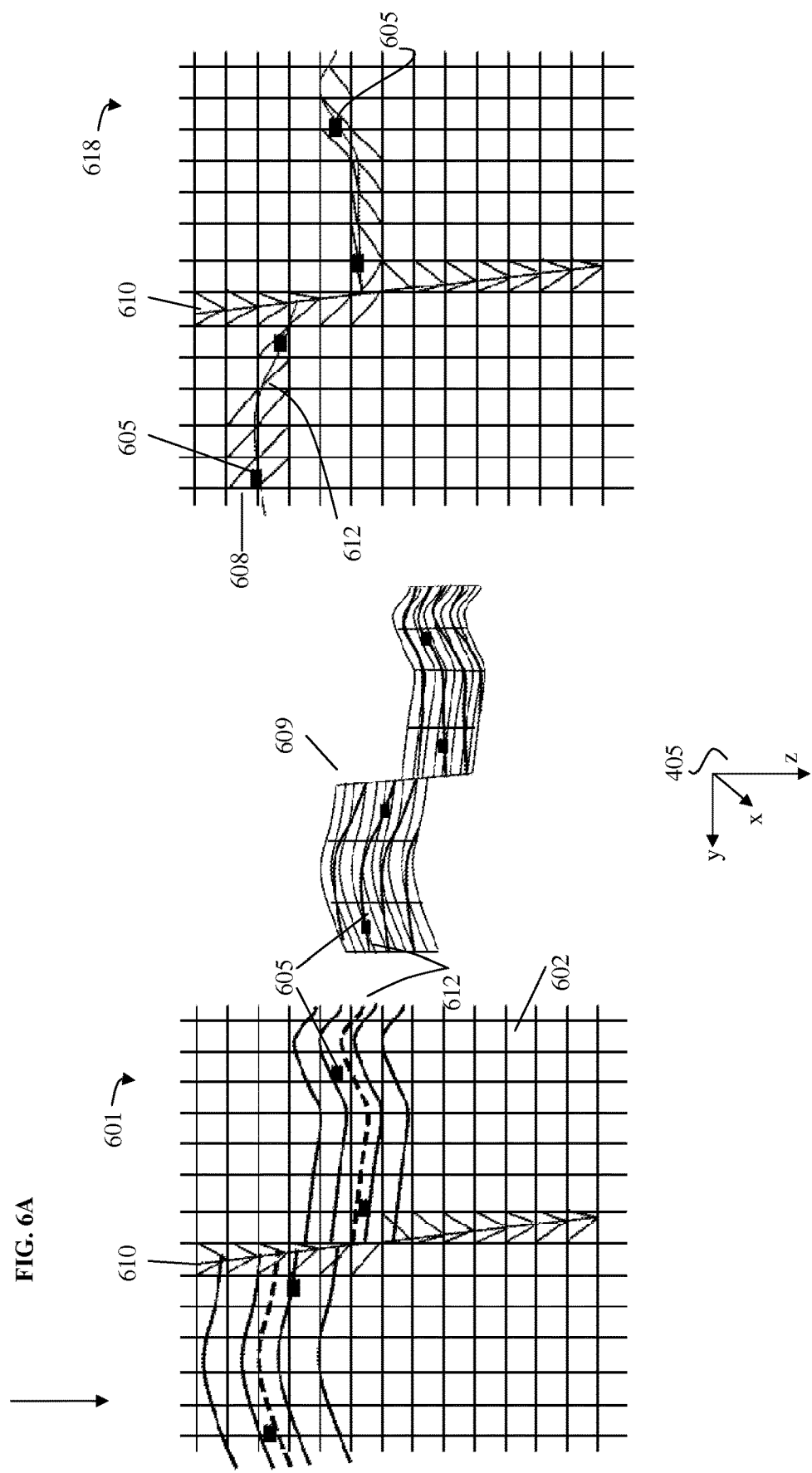
FIGS. 6A and 6B are schematic illustrations of modeling geological horizons according to well markers in a current model and a depositional model, according to embodiments of the invention.
Figure 6B:
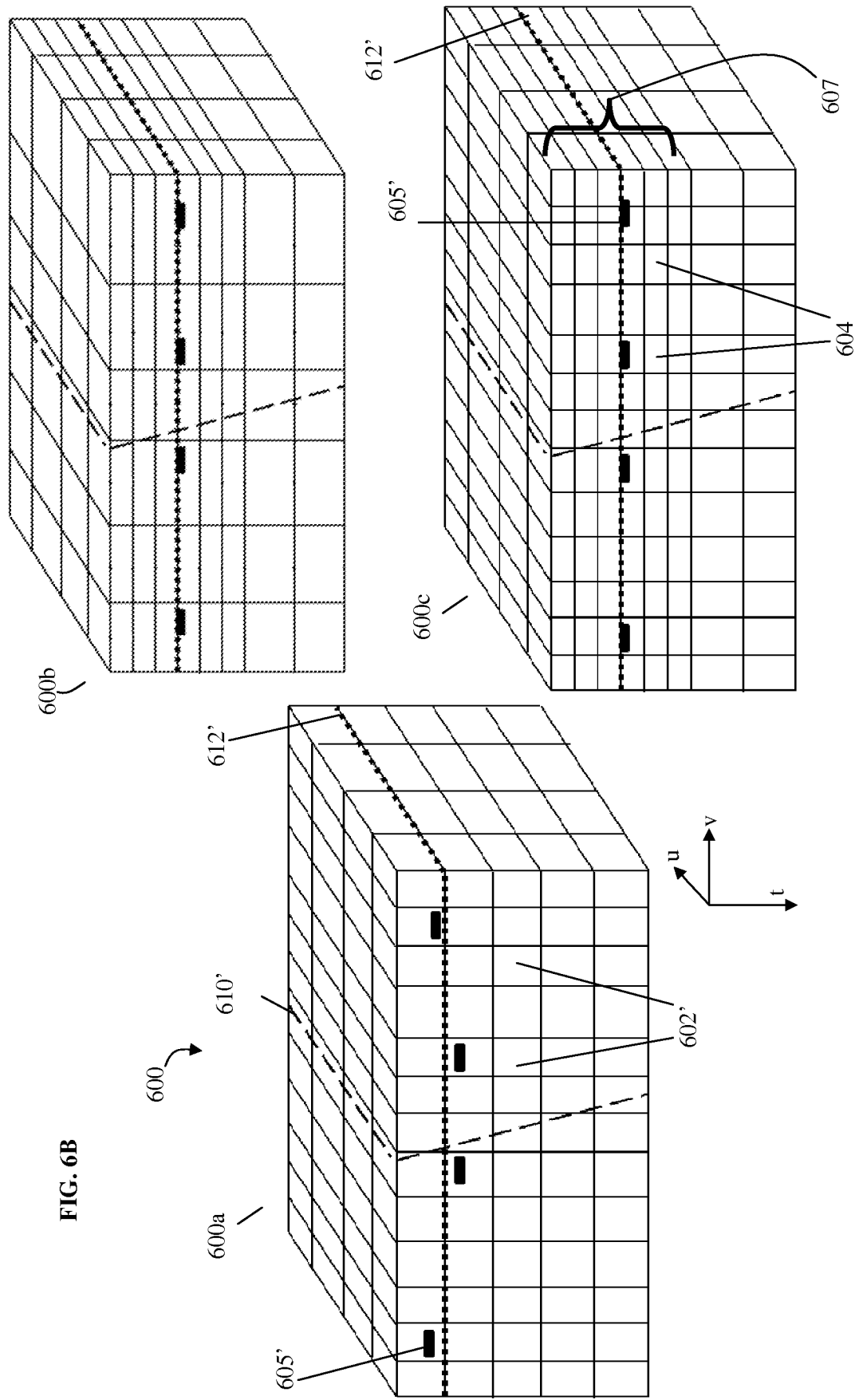

FIGS. 6A and 6B are schematic illustrations of a current model 601 for incorporating a horizon 612 into model 601, according to embodiments of the invention. Data representing geological markers such as well-markers 605, based on received geological data, may be incorporated into geological structures (e.g., horizons and faults) modeled on a depositional model 600 or a current model 601. A well-marker may be data describing or "marking" an accurate recorded or measured location of geological data measured in a current time period. Wells may be exact in defining the locations of sub-surfaces, but due to the high cost of drilling wells, wells may only provide accurate data at limited points in a sub-surface, and thus interpolating points between well-markers with a smooth horizon or iso-surface may be difficult. Iso-surfaces or geologic horizons 612 may be modeled to pass through these well-markers, which may be fixed data. Other geological markers may be used to describe other points or structures through which a geologic horizon or other structures may pass, for example fault-markers describing locations where a fault may pass.

When initially placed on a first current mesh 602 having a first relatively coarse resolution, as shown in FIG. 6A, horizon 612 may not intersect or align properly with well markers 605, for example, because the cell resolution of the mesh 602 may not be high enough to capture the horizon as passing through a precise location described by the well-marker 605 (e.g., the location of the horizon may only be approximate, with an spatial error of up to a cell dimension, whereas the location of well-marker 605 is typically exact). Since horizons are generally deposited during a similar depositional time period (e.g., over the same 1-100 thousand years), geologic horizon 612 of current model 601 of FIG. 6A may be mapped to a level or planar surface, such as an iso-t surface 612', in a depositional model 600a of FIG. 6B. This uvt-transformation of first current model 601, illustrated at first depositional model 600a in FIG. 6B, illustrates a misalignment between transformed well-marker data 605' and horizon 612'. Detecting misalignment may be determined by, for example, a mean square error analysis or other error analysis between the well-marker data 605' and the modeled geological structure. If a misalignment is detected between the well-marker data 605' and a geological structure, such as the modeled horizon 612', the transformation function and the location of the horizon 612' iso-surface may be corrected to match the well-marker data 605'.

To correct the horizon 612', an induced or adapted mesh 609 may be generated or built, which may be based on the initial current model 601. An induced mesh may be a mesh in which the curvature or resolution of the mesh may be non-uniformly "adapted" to conform or align to the geological structures. Embodiments in accordance with the present invention for generating the induced mesh based on an initial model of geological structures may be found, for example, in U.S. Pat. Application Pub. No. 2013/0231903, which is incorporated herein by reference in its entirety.

The induced mesh 609 may start with the resolution of the mesh 602' in the depositional model 600a defining a volume of interest (e.g., the full model or divided sub-model), and the resolution may be increased anisotropically, or in a particular direction and decreased in the other two directions, to ensure an iso-surface of the depositional model (e.g., an iso-t surface representing horizon 612') intersects a set of well markers 605' corresponding to horizon 612'. The resolution of the induced mesh 609 may be increased anisotropically in only one dimension (the t-dimension) of the three dimensions of the model (but not along the u- and v-dimensions) and may correspond to a transformed anisotropic depositional model 600b (an anisotropic model having different resolutions in different dimensions). The uvt-transformation may be recomputed for the horizon in the more adapted resolution anisotropic model 600b or 609 to generate a refined horizon 612' that aligns with well-markers 605'. In one example, the t-dimension in the anisotropic depositional model 600b may have a finer resolution relative to the coarser resolutions in its u- and v-dimensions. When increasing the resolution anisotropically in the t-dimension, the resolution of the u- and v-dimensions in model 600b may be decreased to have a resolution that is less than the initial resolution along those dimensions in the first depositional model 600a. Increasing the resolution anisotropically along the t-dimension in the depositional model 600b may allow the recomputed horizon 612' to get closer to and align or intersect with, exactly or relatively more approximately than prior to the resolution increase, the well markers 605'. Decreasing the resolution anisotropically along the u- and v-dimensions in the anisotropic depositional model 600b may allow the horizon 612' to remain more continuous or smoother while the t function is being corrected.

After the anisotropic increase in resolution in one dimension (the t-dimension) and the alignment of the well-markers and horizons in anisotropic depositional model 600b, the resolution of the model may be increased in the other dimensions (the u- and v-dimensions) to generate refined model 600c. For example, the depositional model 600b may be further refined to depositional model 600c by increasing the resolution of the coarser u- and v-dimensions to be greater than or equal to the resolution of their initial resolution in first depositional model 600a. As shown, the final depositional model 600c (in each iteration) may have an increased resolution along the t-dimension and greater (or equal) resolution along the u- and v-dimensions, relative to the resolution in first depositional model 600a.

The final, corrected horizon 612' in the refined depositional model 600c (or refined sub-volume 607) may be inverse transformed to generate a refined current horizon 612 in anisotropic current model 609. The induced mesh 609 and its transformed sub-volume 607 may be temporary structures used to correct horizon 612, 612', after which the induced mesh 609 is discarded and the corrected horizon 612, 612' may replace (or be added or inserted into) a corresponding geological region of the second current model 618. Corrected horizon 612' may be an iso-surface that is inserted into the initial model 601 to divide the cells of the model and thereby generate an updated second current model 618 with a locally increased resolution (e.g., greater density of cells) as compared with the first current model 601.

While the examples illustrated in FIGS. 6A and 6B show increasing resolution from initial models 601 or 600a to anisotropic models 609 or 600b, respectively, via a finer resolution in the t-dimension and a coarser resolution in the u- and v-dimension (e.g., at intermediate depositional model 600b), other increases in resolution may be performed anisotropically in the u- and/or v-dimensions. In one embodiment, the increase in resolution may occur through a finer resolution in the u-dimension and a coarser dimension in the v- and t-dimensions, for example, when a geological structure generally aligns or is oriented along the u-dimension. Similarly, the increase in resolution may occur through a finer resolution in the v-dimension and a coarser dimension in the u- and t-dimensions, for example, when a geological structure generally aligns or is oriented along the v-dimension. The one or more dimensions in which the model resolution is anisotropically increased may depend, for example, on the shape, orientation or primary direction of the geological structures being modeled.

In general, an iteration of increasing the resolution of a mesh may involve first detecting a set of well-marker data that aligns or intersects approximately, but not within a threshold proximity, with geological makers. Then a resolution in at least one dimension, e.g., in which the geological structures or its aligned iso-surfaces are primarily oriented, may be increased anisotropically so that the resolution is finer in the at least one dimension relative to coarser resolutions in the other dimensions. This allows a continuous geological structures or its aligned iso-surface in the at least one dimension to get closer to and coincide or align with the well-marker data. A single dimension may be refined when the geological structure is primarily oriented along iso-surfaces of a single dimension and two dimensions may be refined when the geological structure is oriented diagonally with respect to iso-surfaces of the two dimensions (at least one dimension is not refined in the anisotropic increase in resolution). Finally, after the anisotropic increase in resolution in the at least one dimension, the function or uvt-transformation of the geological structure may be recomputed to generate a new iso-surface. The anisotropic increase in resolution and recomputation of the horizon function may be repeated until the function includes an iso-surface that aligns or intersects with the set of well-markers. A mesh may be further refined by increasing the coarser resolutions in the other (second and/or third) dimensions.

Accordingly, the first depositional model 600a may be updated, created or transformed into a final or second depositional model 600c (in each iteration) which includes mesh cells at a higher resolution 604, for example, around a volume or area of interest 607, such as, a local volume or area in the vicinity of a horizon 612' (e.g., within a threshold distance of horizon 612'). The higher resolution of second depositional model 600c may be achieved through one or more steps of increasing the resolution of the first depositional model 600a anisotropically to an intermediate depositional model 600b, where one or two dimensions has a finer resolution relative to the other dimensions of the three-dimensional model 600b. The mesh cells 604 of second depositional model 600c around horizon 612' may represent a smaller volume or area of subsurface structure than the mesh cells 602' of model 600a and the mesh cells 602' in other locations outside of the volume of interest 607 of second depositional model 600c. In general, different local areas or sub-volumes of a mesh may have different resolutions, depending on the type or size of the subsurface structure being modeled. For example, local areas around a horizon 612' may have a greater resolution in the t-dimension relative to other dimensions, whereas local areas around a fault 610' may have a greater resolution in the u- and/or v-dimensions relative to other dimensions.

In a multi-scale, multi-resolution mesh, during the transformation in the local area (e.g., local area 607), a large scale model or mesh may be sub-divided into N zones or sub-volumes, where each zone or sub-volume may be processed individually. For example, model 601 may be refined layer-by-layer (e.g., from top to bottom such as in the positive z-direction 405) or subvolume-by-subvolume. For example, a model's 100 m$^3$ zone or volume may be subdivided into eight 50 m$^3$ smaller zones or sub-volumes, and each zone or sub-volumes may be processed or iterated over independently from one another, for example, in sequence or simultaneously in parallel. For computational and memory efficiency, each zone may be processed or iterated in sequence, and the number of iterations in each zone may depend on the size of geological structures modeled within the zone. Each zone or sub-volume may be iterated over the same or different numbers of times to achieve the same or different resolutions in each sub-volume. For example, a sub-volume in which horizon 612' more closely fits well markers 605' may not be refined or may be refined in fewer than N iterations to generate a relatively coarser model, whereas a sub-volume in which horizon 612' less closely fits well markers 605' may be refined in greater or equal to N iterations to generate a relatively finer model.

After generating geological structures such as horizon 612' that substantially intersects well markers 605' in anisotropic model 600c or 609, the geological structures may be incorporated into the initial model 601, to generate a second current model 618. The geological structures (e.g., iso-surface describing horizon 612') may divide cells to increase the model 618 resolution in a local area or area of interest 609. Accordingly, the second iteration model 618 may include more iso-t lines 612 (e.g., has a higher resolution in the t-dimension) following the curvature of horizons 505 than are represented in the first current model 601. The resolution in local area 607 may be different from a resolution in a different local area with less detailed surface formations. In a depositional model, the mesh of cells may be more dense (e.g., have a higher resolution) in the vertical t-direction than in the u or v dimensions, and the spacing between cells in the t-dimension of the mesh may be smaller than in the t-dimension of cells outside the volume of interest. Since a current model may be transformed from the depositional model, the current model may likewise include a mesh of cells that are more dense in the z-dimension than in the x and y dimensions. A similar increase in resolution may occur in the u,v dimensions in the depositional model 600, corresponding to an in increase in resolution in the x,y dimensions of the current model 601.

For example, as shown, a uvt function computed based on current model 601 may be illustrated as first model 600a, in which the iso-t surfaces are not aligned with the markers. This may be because the cells in current model 601 may be initially regular and the well markers are sparse points. To remedy the error between horizon 612 and well-markers 605 (illustrated as misalignment in both current model 601 and first depositional model 600a) an updated second model 600c, which may be coarse in a horizontal resolution and fine in a vertical resolution, is generated. The inverse transformation of updated second model 600c, may also allow a more aligned horizon 612' with well-markers 605' and may be inversely transformed into xyz-space and inserted into a second current model 618.

The resolution of the model may be iteratively increased a number of N times, each time incorporating one or more new geological structures. An Nth current model, for example, may be inversely transformed from an Nth depositional model with cells at an increasingly higher resolution (and thus, cells with smaller dimensions), than the cells of an initial model.

As shown in second model 600c of FIG. 6B, the cells' 604 resolution may increase in the t-dimension so that well-markers 605' may align with horizons 612' on the same iso-t plane. In other embodiments, the resolution of cells 604 may increase in the (u) and (v) direction for a greater degree of accuracy in the (u) and (v) direction. Based on the updated T(x,y,z) transformation, U(x,y,z) and V(x,y,z) may be further updated so that they remain orthogonal to T(x,y,z) in a depositional model. Updated second current model 618 may include horizon 612, which is the inverse transform of horizon 612' in second depositional model 600c, which now includes the proper alignment of well-markers 605' with horizon 612'.

In general, transformation of meshes or models (e.g., transformation from a current model 601 to a depositional model 600a) may be restricted by geological features, such as fault 610, as a constraint in the DSI method. The transformation to UVT-space may be used to represent geological structures at a prior geological time (e.g., millions of years ago). Similarly, current model 601 may be inversely transformed from depositional model 600a to represent geological structures at a current or recent geological time (e.g. within the past 1-100 thousand years).

With subsequent iterations, a Nth depositional model may be derived or updated from a Nth updated mesh to include more detailed geological structures. A Nth current model may be determined by an inverse transformation of a Nth depositional mesh. Depositional model 600c or current model 601 may further be updated to convert cells to a polyhedral sub-mesh 608 if they contain or intersect with the set of geological structures or discontinuities (e.g. horizons 612 and well markers 605). A merged or combined current model 618 may include inversely transformed cells or iso-surfaces of the Nth updated depositional mesh, e.g., a mesh that describes a fault 610, horizons 612, well-markers 605, and polyhedral sub-mesh parts 608 in cells that intersect with these geological structures.

Although embodiments described in FIGS. 6A and 6B show methods that increase resolution in depositional (u,v,t) space (e.g., 600c) in order to correct alignment or placement of geological structures placed in (x,y,z) current space (e.g., horizons 612 represented by well-markers 605), this is meant for illustrative purposes. Other embodiments may increase resolution and incorporate geological structures in any combination of (x,y,z) space and (u,v,t) space or other kinds of coordinate systems having iso-surfaces that may be transformed to other coordinate systems.

FIGS. 7A and 7B are schematic illustrations of a current model 701 incorporating multiple geological structures, according to embodiments of the invention. In FIG. 7A, a current model 701a may, for example, incorporate a fault 703, for example, using an initially cubic or hexahedral mesh, and a first horizon 705a. First horizon 705a may be incorporated according to the description provided in reference to FIGS. 6A and 6B. In a next iteration, for example, the process described in FIGS. 6A and 6B may be repeated to incorporate a second horizon 705b into current model 701a. The updated second model 618 in FIG. 6A may be used as the initial model, and the inserted horizon 612 may be fixed onto current model 701a. A function may be computed for the second horizon 705b, and the function may include an iso-surface in a depositional transformation of current model 701. A processor may detect if the iso-surface (not shown) representing second horizon 705b intersects a set of geological markers associated with the second horizon 705b, within a threshold proximity. If the iso-surface representing second horizon 705b does not intersect the set of geological markers, an induced mesh may be used to correct the initial model (in this iteration, the initial model is shown as updated model 618). The induced mesh may have an increased cell resolution for computing another corrected function for second horizon 705b. The corrected function representing second horizon 705b may intersect the set of geological markers within the threshold proximity. Second horizon 705 may be inserted into current model 701a, where cells intersecting the second horizon 705b may be divided by the iso-surface representing second horizon 705b, and may thus have a locally increased resolution relative to other cells 704 that do not contain iso-surfaces representing geological structures. As shown, current model 701 may illustrate a subsequent iteration after updated current model 618 in FIG. 6A, where second horizon is fixed onto a second updated current model (in a second iteration). Current model 701 may include two horizons 705a and 705b, which may, at depositional time be flat iso-t surfaces, or surfaces that each have a constant depositional time t-value across the (u,v) plane. Iso-t surfaces 711, which are in the local area or between horizons 705, may have the same or nearly the same curvature as horizons 705.

Current model 701 may undergo another iteration shown partially at current model 701b. Iso-surfaces 711 between horizons 705a and 705b may be inserted into current model 701b, for example, to describe geological structures having finer details. As further described in FIG. 7B, current model 701b has an increased resolution within volume of interest 709, e.g., between two horizons 705a and 705b. As a result of the increased resolution, current model 701 may include iso-t surfaces 711 which may represent a greater density of surfaces 711 than horizons 705, or may simply describe or represent an estimation of more detailed formations. In a different local area, for example outside of horizons 705a and 705b, the density of iso-t surfaces may be different, e.g., less dense, due to less detailed formations represented in a different local area.

In FIG. 7B, current model 701a may be used as an initial model for the next iteration of modeling geological structures, such as iso-surface 706. Current model 701c may initially include a function of iso-surface 706 using seismic data that is less accurate than a set geological markers 715 associated with iso-surface 706. Current model 701c may incorporate geological markers 715 in order to correct or modify iso-surface 706. As shown in current model 701c, iso-surface 706 may not intersect the set of geological markers 715 within a threshold proximity (e.g., within a calculated error threshold). In corresponding depositional model 702d, which may be a transformation of current model 701 to depositional space, iso-surface 706' may also not intersect or align with geological markers 715'.

Similar to induced mesh 609 in FIG. 6A, an induced mesh 717 may be used to correct iso-surface 706 to intersect geological markers 715 within a threshold proximity. Induced mesh 717 may have an anisotropically increased resolution between horizons 705a and 705b, and around iso surface 706. As shown in both induced mesh 717 and its corresponding anisotropic depositional mesh 717d, the anisotropic increase in resolution may align the iso-surface 706 and 706' to geological markers 715 and 715', and may decrease the resolution in orthogonal dimensions to allow the updated iso-surface to remaining smooth. If the updated iso-surface is verified to substantially match the geological markers 715, the iso-surface may be fixed in induced mesh 717.

After the iso-surface is finalized in this iteration, it may be inserted into an induced mesh 719. As shown in second induced mesh 719, the resolution of induced mesh 717 may be further increased along iso-u and iso-v lines to capture greater accuracy in the u- and v-dimensions in depositional model 719d, as compared to the depositional model 702d and anisotropic depositional model 717d. Induced mesh 719 may have a resolution in u and v equal to or greater than the initial resolution in those dimensions of initial model 701c. If no more geological structures are to be modeled at a finer scale or finer resolution, the induced mesh 719 may a final mesh in which all the geological structures modeled at different scales and resolutions are present.

In a next iteration for refinement, induced mesh 719 may be used to replace the initial model 701c, and the steps described may be repeated to add another geological structure. Further N iterations for refinement may add N iso-surfaces 706 representing N geological structures. In other embodiments, an Nth iteration may include a refinement or re-computation of the iso-surface representing a single geological structures, each refinement providing greater accuracy, until an Nth refinement generates N an iso-surface that substantially matches the well markers 715. Iterations may further include a combination of updated models with inserted iso-surfaces and induced meshes.

Figure 8:
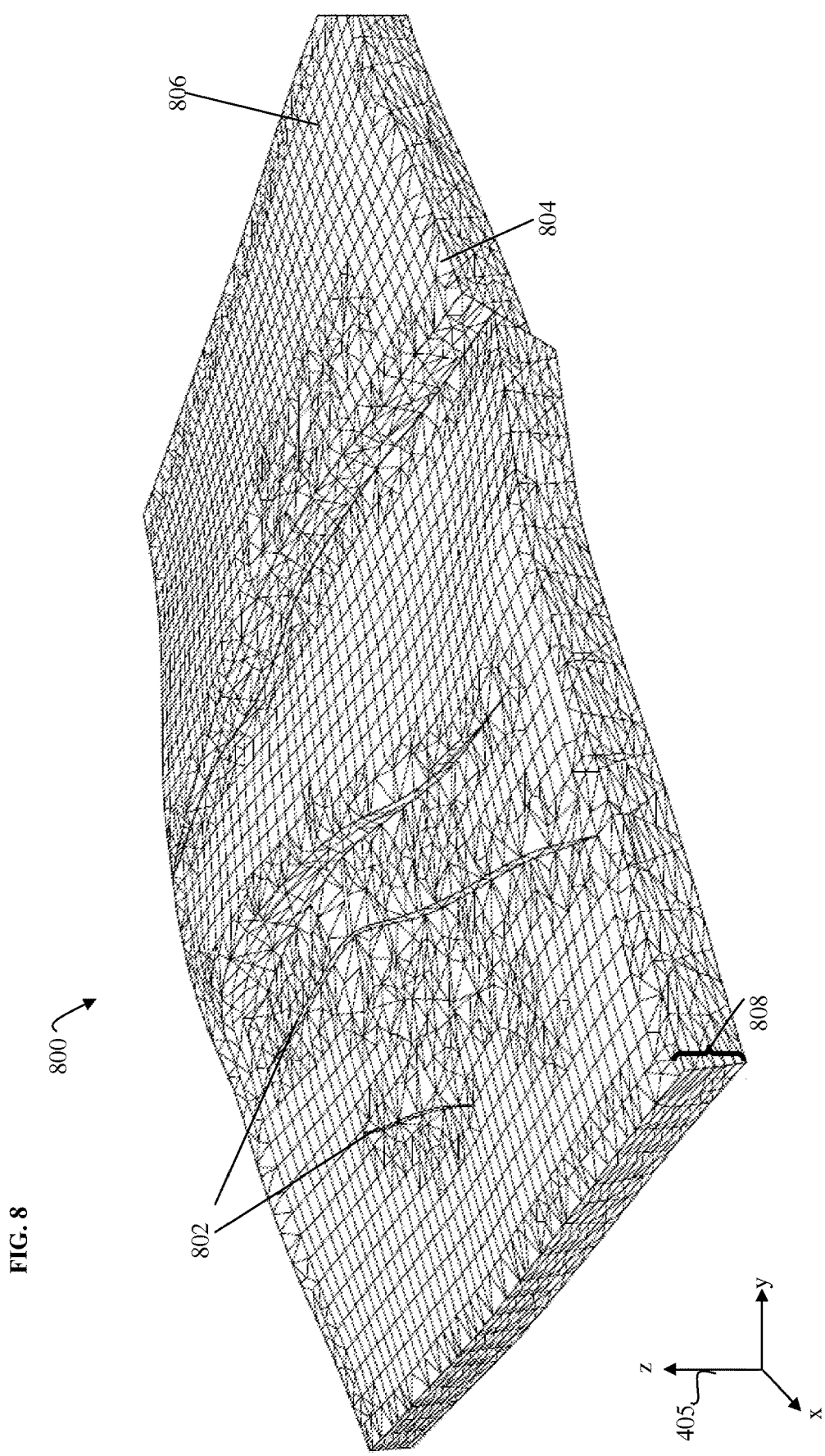
FIG. 8 is an illustration of a three dimensional current model derived from a multi-scale depositional mesh, according to embodiments of the invention.

FIG. 8 is an illustration of a three dimensional current model 800 derived from a multi-scale model, according to embodiments of the invention. The current model 800 may include inverse transformations of tetrahedral cells 804 (in other embodiments, the cells may be polyhedral) near faults 802. Further from the faults 802, hexahedral cells 806 may be more prevalent. In order to more precisely illustrate or model horizons, the increased resolution of cells in the t-dimension may provide more detail in the z-dimension 808 of current model 800. Increased resolution of iso-u and iso-v lines may be optional.

FIG. 9 is a flowchart of a method 900, according to embodiments of the invention. Operations 902-910 may be executed using devices and components of the system of FIG. 1, for example, processor 140 may execute operations 902-910 and display 180 may execute operation 808, although other devices and systems may be used to execute these operations.

In operation 902, a processor may, in an initial model with cells having an initial resolution, compute a first function for a geological structure such as a horizon, for example. The first function may include or describe a first iso-surface in a transformed coordinate space, such as depositional space that estimates the configuration of the horizon at a time of original deposition.

In operation 904, the processor may detect if the first iso-surface intersects a set of geological markers within a threshold proximity. Because the first iso-surface may be calculated based on seismic data, the first iso-surface, e.g., horizon, may not align properly with well-markers that describe a precise location where a horizon is detected to pass.

In operation 906, if the first iso-surface does not intersect the set of geological markers within the threshold proximity, the processor may correct the initial model using an induced mesh having an increased cell resolution for computing a second function for the geological structure. The induced mesh may have a cell resolution that is increased anisotropically, or in a manner that is directionally dependent. For example, the induced mesh in depositional space may include cells that have an increased resolution in the t-dimension, but a decreased resolution in the u- and v-dimension. Other ways of increasing resolution may be used. The anisotropically increased resolution may allow calculation of a second function representing a second iso-surface. The second iso-surface may be modeled closer to the set of geological markers than the first iso-surface since the second iso-surface is generated on a mesh with a relatively higher resolution. The second more refined iso-surface may be detected to intersect the set of geological markers within the threshold proximity and its location fixed.

In operation 908, a processor may generate a second model including the second iso-surface. The second model may have a locally increased resolution relative to the initial model caused by dividing cells in the second model along the second iso-surface.

In operation 910, a processor may repeat or iterate operations 902-908 for a plurality of iterations, each iteration using a new geological structure. The second model may be used as the initial model in subsequent iterations.

In one embodiment, the second model may be an update of the initial model, where the second iso-surface is inserted into the initial mesh by cutting cells of the initial mesh along the refined iso-surface and locally increasing resolution in those cells. Alternatively or additionally, the second model may be the induced mesh which may be further refined in later iterations through the generation of a second induced mesh.

When used herein, refining the mesh or increasing the resolution of the mesh may refer to increasing the number of cells per volume throughout the mesh or globally (e.g. along an iso-surface, or in all or a majority of mesh regions along a dimension). In contrast, adding geological structures may also increase the number of cells per volume e.g. by splitting cells along faults, though this increase is generally local e.g. in the region where the geological structures are being added.

When used herein, cells may refer to basic units of modeling or smallest components of a mesh. Cells are typically hexahedral or tetrahedral in 3D models and squared or triangular in two dimensional (2D) models, although other polyhedron or polygon shapes may be used for cells, such as, hexahedrons, prisms, pyramids, or general polyhedrons in 3D models or quadrilaterals, pentagons or general polygons in 2D models.

When used herein, faults may include faults, unconformities, eroded surfaces (a form of unconformities).

When used herein, geological structures such as horizons, faults, well markers, etc. may refer to the actual geological structure existing in the real world, or to computer data representing such structures (e.g., stored in a memory or mass storage device). Some structures when represented in a computing device may be approximations or estimates of a real world structure, or a virtual or idealized structure, such as an idealized horizon as produced in a UVT-transform. A model, or a model representing subsurface structures or the location of those structures, is typically an estimate or a "model," which may approximate or estimate the physical subsurface structure being modeled with more or less accuracy.

Embodiments of the invention may include an article such as a computer or processor readable non-transitory storage medium, such as for example a memory, a disk drive, or a USB flash memory device encoding, including or storing instructions, e.g., computer-executable instructions, which when executed by a processor or controller, cause the processor or controller to carry out methods disclosed herein.

Different embodiments are disclosed herein. Features of certain embodiments may be combined with features of other embodiments; thus certain embodiments may be combinations of features of multiple embodiments.

The foregoing description of the embodiments of the invention has been presented for the purposes of illustration and description. It is not intended to be exhaustive or to limit the invention to the precise form disclosed. It should be appreciated by persons skilled in the art that many modifications, variations, substitutions, changes, and equivalents are possible in light of the above teaching. It is, therefore, to be understood that the appended claims are intended to cover all such modifications and changes as fall within the true spirit of the invention.

What is claimed is:

1. A method for generating a model of one or more geological structures, comprising:
    (a) computing a first function for a geological structure, wherein the first function includes a first iso-surface in a transformed coordinate space of an initial coordinate space and generating an initial model of the geological structure having an initial resolution of cells that are divided along the first iso-surface;
    (b) detecting if the first iso-surface intersects a set of geological markers within a threshold proximity;
    (c) if the first iso-surface does not intersect the set of geological markers within the threshold proximity, correcting the initial model using an induced mesh having an increased cell resolution for computing a second function for the geological structure to improve the accuracy of a location of the geological structure in the initial model, wherein the second function includes a second iso-surface in the transformed coordinate space that intersects the set of geological markers within the threshold proximity;
    (d) generating a second model including the second iso-surface, wherein the second model has a locally increased resolution relative to the initial model caused by further dividing cells in the second model along the second iso-surface;
    for each new geological structure, repeating steps (a)-(d), using the second model as the initial model; and
    displaying a visualization of the second model.

2. The method of claim 1, wherein the second model is the initial model with the second iso-surface.

3. The method of claim 1, wherein the second model is the induced mesh.

4. The method of claim 1, wherein axes of the induced mesh include iso-surfaces of the initial model in the transformed coordinate space.

5. The method of claim 1, wherein the initial coordinate space models geological structures at a current time period and the transformed coordinate space models geological structures at a time of original deposition.

6. The method of claim 1, wherein the induced mesh has a cell resolution that is anisotropically increased or decreased, wherein cells in the induced mesh have a finer or coarser resolution in one dimension relative to the resolutions in the other dimensions.

7. The method of claim 6, wherein the first and second iso-surfaces each have a different constant value in the one dimension.

8. The method of claim 1, wherein the second model includes a mesh with a relatively greater resolution of cells than a mesh of the initial model.

9. The method of claim 1, wherein correcting the initial model using the induced mesh comprises increasing the resolution of cells in a volume of interest.

10. The method of claim 1, comprising, for cells in the second model that intersect the second iso-surface, converting each of the said cells to a sub-mesh comprising polyhedron sub-mesh parts, each sub-mesh part with at least one facet approximating the orientation of the incorporated subsurface structures.

11. The method of claim 10, wherein at least some of the sub-mesh parts are non-hexahedral polyhedrons.

12. The method of claim 1, wherein the cells of the model are predominantly hexahedral.

13. The method of claim 1, wherein the iso-surfaces estimate a configuration of the geological structures at a time of original deposition within the Earth.

14. The method of claim 13, comprising transforming the iso-surfaces from the transformed coordinate space to a current coordinate space representing a configuration of the geological structures at a current time period.

15. The method of claim 1, comprising receiving data representing the set of geological markers which describe an observed configuration of geological structures in a current time period.

16. The method of claim 1, comprising dividing the initial model into N sub-volumes and processing each sub-volume independently for the same or different number of iterations to independently increase resolution in each sub-volume.

17. A system for modeling a geological structure, the system comprising:
    one or more processors configured to:
        (a) compute a first function for a geological structure, wherein the first function includes a first iso-surface in a transformed coordinate space of an initial coordinate space and generate an initial model of the geological structure having an initial resolution of cells that are divided along the first iso-surface;
        (b) detect if the first iso-surface intersects a set of geological markers within a threshold proximity;
        (c) if the first iso-surface does not intersect the set of geological markers within the threshold proximity, correct the initial model using an induced mesh having an increased cell resolution for computing a second function for the geological structure to improve the accuracy of a location of the geological structure in the initial model, wherein the second function includes a second iso-surface in the transformed coordinate space that intersects the set of geological markers within the threshold proximity;
        (d) generate a second model including the second iso-surface, wherein the second model has a locally increased resolution relative to the initial model caused by further dividing cells in the second model along the second iso-surface; and
        for each new geological structure, repeat steps (a)-(d), using the second model as the initial model;
    and a display to visualize the second model.

18. The system of claim 17, wherein the second model is the initial model with the second iso-surface.

19. The system of claim 17, wherein the second model is the induced mesh.

20. A method, comprising:
    receiving geological data representing a configuration of geological structures at a current geological time;

transforming the geological data to a first depositional model comprising an initial division of cells along a first set of iso-surfaces at a first resolution, wherein the cells represent an estimated configuration of a first set of geological structures at a time of original deposition;

in response to detecting that the transformed geological data does not intersect a set of geological markers, updating the first depositional model to create a second depositional model comprising a further division of cells along a second set of iso-surfaces at a second resolution greater than the first resolution to improve the accuracy of a location of the geological structure in the initial model;

re-transforming the geological data to the second depositional model to generate transformed geological data that intersects the set of geological markers; and displaying a visualization of the second model.

21. The method of claim 20, wherein the transformation is a three-dimensional transformation from xyz-space to uvt-space.

22. The method of claim 20, comprising inverse transforming the transformed geological data that intersects the set of geological markers to the current geological time; and inserting the inverse transformed geological data into a current time model.

23. The method of claim 20, comprising, for cells that intersect the geological structures, dividing each of the cells into a sub-mesh comprising polyhedral sub-mesh parts, each sub-mesh part with at least one facet approximating the orientation of the geological structures.

* * * * *